(12) United States Patent
Hiddink et al.

(10) Patent No.: US 8,540,556 B2
(45) Date of Patent: Sep. 24, 2013

(54) DEVICE AND METHOD FOR BRINGING INTO POSITION AND ARRANGING A CARCASS OR CARCASS PART OF SLAUGHTERED POULTRY ON OR IN A PRODUCT CARRIER

(75) Inventors: Wilbert Hiddink, Varsseveld (NL); Marc Kroot, Sint Anthonis (NL); Adrianus Josephes Van Den Nieuwelaar, Gemert (NL)

(73) Assignee: Stork PMT B.V., Boxmeer (NL)

( * ) Notice: Subject to any disclaimer, the term of this patent is extended or adjusted under 35 U.S.C. 154(b) by 809 days.

(21) Appl. No.: 12/665,667

(22) PCT Filed: Jun. 23, 2008

(86) PCT No.: PCT/NL2008/000159
§ 371 (c)(1),
(2), (4) Date: Feb. 25, 2010

(87) PCT Pub. No.: WO2009/002153
PCT Pub. Date: Dec. 31, 2008

(65) Prior Publication Data
US 2010/0323599 A1    Dec. 23, 2010

(30) Foreign Application Priority Data

Jun. 22, 2007  (NL) .................................... 1034027
Jan. 31, 2008  (NL) .................................... 2001241

(51) Int. Cl.
 *A22C 25/12* (2006.01)
(52) U.S. Cl.
 USPC ........................................................ 452/179

(58) Field of Classification Search
 USPC ................................................... 452/177–179
 See application file for complete search history.

(56) References Cited

U.S. PATENT DOCUMENTS

| 2,560,067 | A | * | 7/1951 | Bell ............................... 452/174 |
| 2,785,437 | A | * | 3/1957 | Standley et al. ............... 452/174 |
| 2,958,092 | A | * | 11/1960 | Curtis ............................ 452/183 |
| 3,979,793 | A | * | 9/1976 | Hazenbroek ................... 452/118 |
| 4,283,813 | A | * | 8/1981 | House ............................ 452/106 |
| 4,322,872 | A | * | 4/1982 | Meyn .............................. 452/168 |
| 4,513,476 | A | * | 4/1985 | Olson et al. .................... 452/174 |
| 4,873,746 | A |   | 10/1989 | Scheier et al. |
| 4,899,421 | A | * | 2/1990 | Van Der Eerden ........... 452/116 |
| 5,913,720 | A | * | 6/1999 | Scott et al. ..................... 452/120 |

(Continued)

FOREIGN PATENT DOCUMENTS

EP  0 756 826 A2  2/1997
NL  8201782  11/1983

*Primary Examiner* — Richard Price, Jr.
(74) *Attorney, Agent, or Firm* — Birch, Stewart, Kolasch & Birch, LLP

(57) ABSTRACT

The invention relates to a device for bringing into position and arranging a carcass or carcass part (1) of slaughtered poultry on or in a product carrier (50); which device comprises; —at least one assembly of a movable holder (21) for the carcass or carcass part of slaughtered poultry with positioning means pertaining to the holder for the carcass or carcass part, which holder is adapted for receiving a carcass or carcass part to be arranged on or in a product carrier, —drive means (24) for moving the holder between a receiving position in which the carcass or carcass-part can be received and a transfer position in which the carcass or carcass part is brought into a position relative to the product carrier which is suitable for transfer to the product carrier.

58 Claims, 31 Drawing Sheets

(56) References Cited

U.S. PATENT DOCUMENTS

| | | | |
|---|---|---|---|
| 6,033,286 A * | 3/2000 | Langlinais | 446/481 |
| 6,371,843 B1 * | 4/2002 | Volk et al. | 452/106 |
| 6,398,636 B1 * | 6/2002 | Jansen et al. | 452/122 |
| 7,377,843 B2 * | 5/2008 | Koops | 452/58 |
| 7,597,615 B2 * | 10/2009 | van den Nieuwelaar et al. | 452/182 |
| 7,837,754 B2 * | 11/2010 | Johnson et al. | 55/482 |
| 8,105,138 B2 * | 1/2012 | Van Den Nieuwelaar et al. | 452/177 |

\* cited by examiner

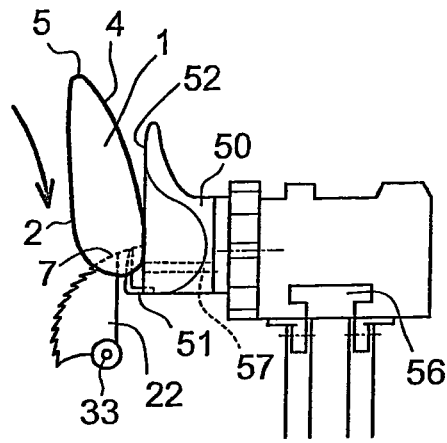
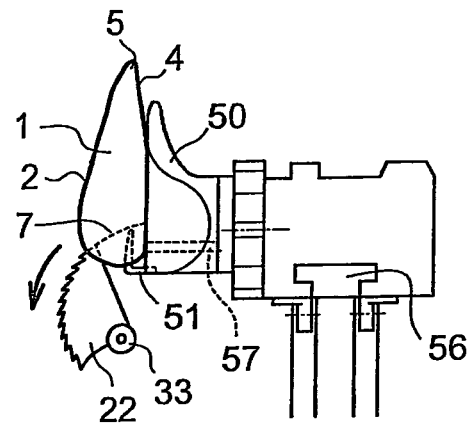
Fig. 8A          Fig. 8B
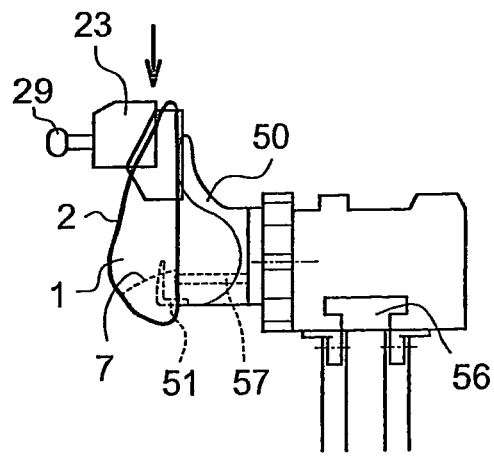
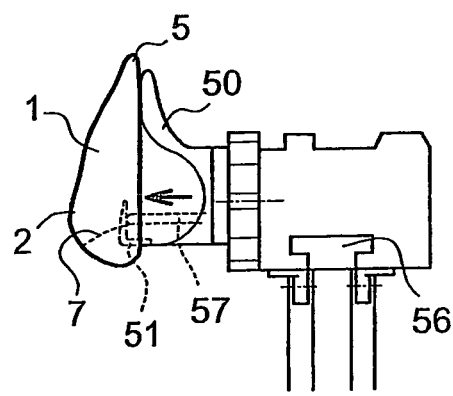
Fig. 8C          Fig. 8D

DEVICE AND METHOD FOR BRINGING INTO POSITION AND ARRANGING A CARCASS OR CARCASS PART OF SLAUGHTERED POULTRY ON OR IN A PRODUCT CARRIER

The invention relates to arranging a carcass or carcass part of slaughtered poultry on or in a product carrier.

For use in poultry slaughterhouses, transportation devices are known with a product carrier or usually a plurality of product carriers which are each suitable for arranging thereon or therein a carcass or carcass part of slaughtered poultry, so that the carcass or carcass part can be moved with the aid of the transportation device. Usually the direction of transportation forms a transportation path along which one or more processing stations are located, so that one or more processes can be carried out on the carcass or carcass part. These processes can be performed automatically by a suitable processing device but can also, or in combination, be carried out by hand. Carcass parts of slaughtered poultry that are processed in this way include, for example, breast caps, front halves, back halves, legs, quarters and drumsticks.

As is known, poultry slaughter installations are largely mechanized, so that a high processing rate and a high yield and quality can be achieved. However, to date, the placing of a carcass or carcass part of slaughtered poultry on or to a product carrier often still takes place by hand in a set-up station wherein one person or usually two persons continuously place carcasses or carcass parts on passing product carriers.

Arranging carcasses or carcass parts of slaughtered poultry manually on or in product carriers is unpleasant and hard work which can lead to physical complaints.

A further drawback of the known devices is that the carcasses or carcass parts do not, once arranged on the product carrier, all assume the same position relative to the product carrier on which they are arranged. This adversely influences the reproducibility of the process to be carried out on the carcasses or carcass parts. In practice, this leads to a lower meat yield than could theoretically be possible.

An object of the invention is to provide a device for arranging a carcass or carcass part of slaughtered poultry on or in a product carrier.

This object is achieved by a device according to claim 1. In this device, the holder, together with the associated positioning means, effects a movement of the carcass or carcass part to a transfer position, wherein the carcass or carcass part is positioned in an effective manner. In the transfer position, the carcass or carcass part can be arranged on or in a product carrier.

An advantage of the device according to the invention is that the carcasses or carcass parts are arranged on or in a product carrier in a reproducible manner. As a result, the carcasses or carcass parts all have (substantially) the same position relative to the product carrier on which or in which they are arranged and the processes can be carried out on the carcasses or carcass parts in a precise manner. This benefits the meat yield.

In an advantageous embodiment, the device according to the invention is provided with an application mechanism for arranging the carcass or carcass part on or in the product carrier. It is also envisaged that an application mechanism could be present which is not part of the device but which is, for example, arranged next to the track of the product carriers.

The positioning means for the carcass or carcass part can form part of the holder but can also be separate from the holder. It is also conceivable for the positioning means to partly form part of the holder and to be partly separate therefrom, as will become apparent from the exemplary embodiment described in greater detail.

Arranging the product carrier of a carcass or carcass part which is already pre-positioned in the holder can then efficiently be carried out by the application mechanism.

It is known to arrange a carcass or carcass part on a product carrier which is designed to arrange the carcass or carcass part thereon by pressing the carcass or carcass part onto the product carrier. In the case of the device according to the invention, any application mechanism is then preferably configured as a pressing mechanism which is designed to press—in the transfer position of the holder with the carcass or carcass part—the carcass or carcass part onto the product carrier, so that the carcass or carcass part is arranged on the product carrier. The Applicant has, for example, introduced to the market transportation devices which are shown in this application by way of example and comprise a plurality of product carriers. A specific embodiment shown herein provides for a breast cap to be pressed from above onto the product carrier with the breast point upward and the neck side at the bottom.

A suitable embodiment provides for the possibility of laying a carcass or carcass part in a holder without any significant force having to be exerted on the carcass or carcass part. That laying-in can then for example take place by hand. The device according to the invention subsequently places the carcass or carcass part on the product carrier and supplies in this case the force which is necessary to, for example, press the carcass or carcass part securely onto the product carrier. This makes the task of arranging carcasses or carcass parts on product carriers physically less demanding.

A further advantage of the device according to the invention is that a higher set-up speed can be achieved as a result of the fact that the carcasses or carcass parts can be laid in the movable holder significantly more quickly than forcefully arranging carcasses or carcass parts on or in a product carrier, such as is often the case in the known devices. This is particularly important because in modern poultry slaughterhouses and modern poultry-processing plants there is a tendency towards increasingly high production speeds. This leads to increasingly high production line speeds, as a result of which the speed at which products are arranged in the line must also increase. The device according to the invention can help to make this easier.

In an advantageous embodiment a feed plate is provided on which a carcass or carcass part can be laid and then can be slid away from the feed plate so that the carcass or carcass part enters the movable holder—which is in the receiving position.

An example of a carcass part which can be arranged on or in a product carrier using the device according to the invention is a breast cap.

When the device according to the invention is used for breast caps, provisions are preferably made to position the breast cap in an efficient manner, so that the arrangement on the product carrier can take place easily and reliably. This positioning can take place in a broad range of different manners. One way is to configure the holder with a V-shaped cross section. This allows the breast cap to be placed in the holder so as to be centred in the longitudinal direction. Positioning can also take place by way of a neck support and/or a pressing member, as will be described in greater detail.

The neck support can for example be a flat plate against which the neck side of the breast cap is laid. As a result, the breast cap is positioned in the holder.

As an alternative, use can be made of the shape of the neck side of the breast cap. The neck side of the breast cap is generally V-shaped, the top of the V shape pointing in the direction of the breast point. This shape can be utilized in the positioning of the breast cap, for example by causing the neck support to engage the breast cap at or in the immediate vicinity of the top of the V shape or on the sides of the V shape. If the wishbone is removed in an automated manner before the breast cap is placed in the holder, the shape of the neck side is highly uniform. This can be used to obtain uniform positioning of the breast caps in the holders.

The breast cap itself is usually substantially V-shaped. Adapting any pressing member thereto also allows the breast cap to be positioned.

As a result of positioning the breast cap in the holder using the positioning means, reproducible, uniform arrangement of the breast caps onto the product carriers is achieved. This allows precise processing of the breast caps. The use of suitable positioning means also allows whole carcasses or carcass parts other than breast caps to be arranged on or in product carriers reproducibly and uniformly.

As is known, a product carrier which is suitable for a breast cap can be provided with a carrying portion that carries the breast cap, which carrying portion is orientable, for example rotatable about one or more axes, thus allowing the breast cap to be brought in a plurality of orientations, in particular for adaptation to a process to be carried out.

The device according to the invention can for example also be used to arrange whole carcasses (which are preferably already made ready to cook), back halves, legs or drumsticks in separating line carriers or cooling line carriers. It is also possible to arrange for example legs, drumsticks, thigh pieces or wings with the aid of the device according to the invention in a product carrier which passes these carcass parts through a system for coating and/or marinating. Also known are product carriers comprising a skewer for carrying the carcass or carcass part. A skewer of this type is pierced at least partly through the carcass or carcass part to be carried, preferably between any bones or bone parts present in the carcass or carcass part.

The invention also provides a system for bringing into position and arranging a carcass or carcass part of slaughtered poultry on or in a product carrier, the system comprising at least one device according to the invention. Preferably, in a system of this type, at least the holder of the device is moveable along a track by associated drive means, in such a way that in a supply station along the track a carcass or carcass part can be received in the holder and is in the transfer position at an application location downstream of the supply station the holder.

At the application location—with the holder with the carcass or carcass part in the transfer position—the carcass or carcass part can then be arranged on the product carrier.

Preferably, a system of this type comprises a plurality of devices according to the invention. These devices can have fixed or variable mutual distances.

It is envisaged that the devices can move along the track independently of one another.

In an advantageous embodiment of the system according to the invention, the devices pass the supply station at a low speed and preferably a relatively small mutual distance. As a result, there is a relatively large amount of time to arrange a carcass or carcass part in the holder of one of the devices of the system. Once a carcass or carcass part has been arranged in the holder and once the device has passed the supply station, the speed of the device can then be increased. The mutual distance between successive devices will then also increase in most cases. In this case, the mutual distances between successive devices and the speed of the devices along the track are preferably at least substantially equated to the mutual distance and the speed of the product carriers at the site of the application location.

The invention will be described hereinafter based on the drawings showing an exemplary embodiment in a non-limiting manner.

In the drawings:

FIG. 8 shows (in detail) the arrangement of a breast cap on the product carrier;

Figure 1A:
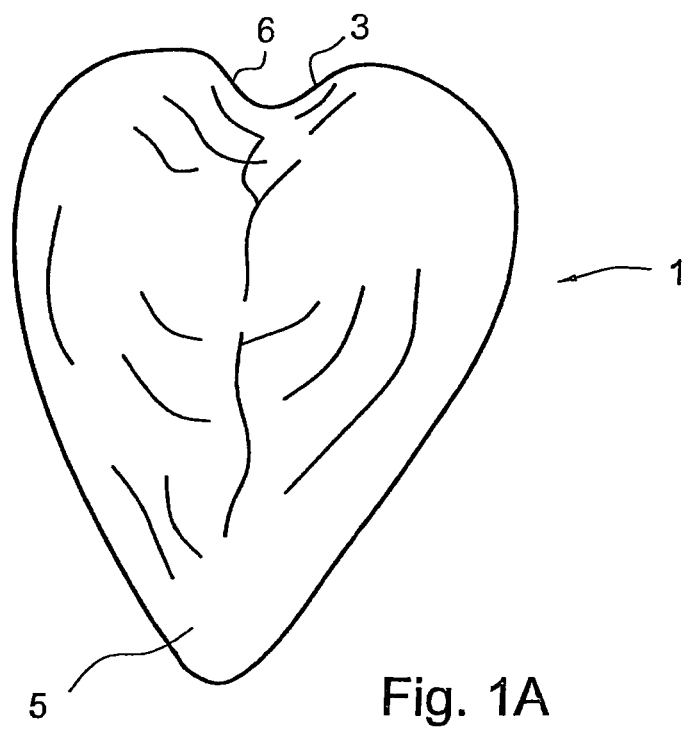
FIG. 1 shows a breast cap of slaughtered poultry.
Figure 1B:
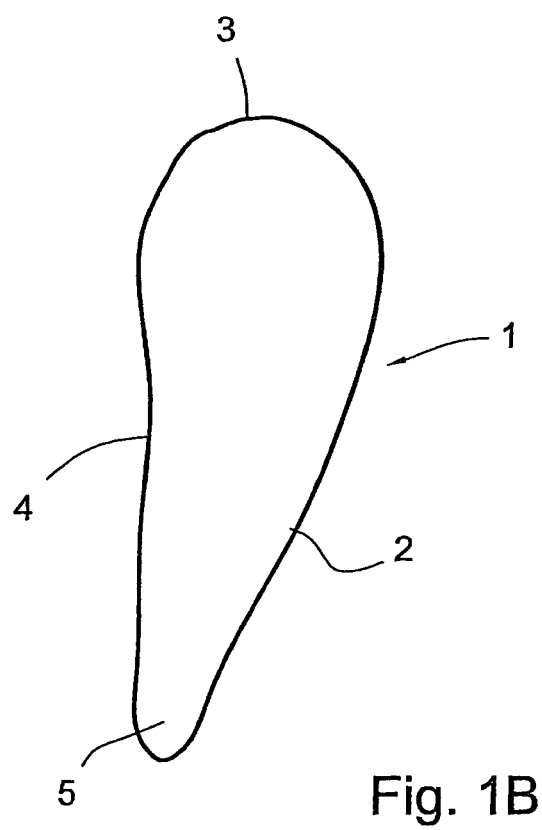

FIG. 1 shows a breast cap 1 of slaughtered poultry. FIG. 1A is a rear view of the breast cap 1 and FIG. 1B is a side view. The breast cap 1 has a front 2, a neck side 3 and a back 4. The back 4 comprises the cutting plane along which the breast cap is cut loose from the remainder of the carcass of the slaughtered poultry.

FIG. 1 clearly shows that the breast cap is substantially V-shaped. The top of the V shape is formed by the breast point 5 which is situated opposite the neck side 3.

At least a part of the neck side 3 also has a V shape which is denoted in FIG. 1 by reference numeral 6. The neck side 3 of the breast cap 1 derives this V shape 6 from the wishbone.

Although not shown in FIG. 1, at least a part of the breastbone is present in the breast cap 1.

Breast caps usually undergo further processing so that the breast meat which is present, for example in the form of fillets, is separated from the bones which are present in the breast cap, such as at least a part of the breastbone and in many cases also a part of the rib cage.

This is generally done by placing the breast cap 1 on a product carrier 50 in a set-up station. The product carrier subsequently conveys the breast cap 1 along a track with one or more processing stations where the breast cap is processed. The processes can take place by hand, partly by hand or entirely automatically.

Figure 2:
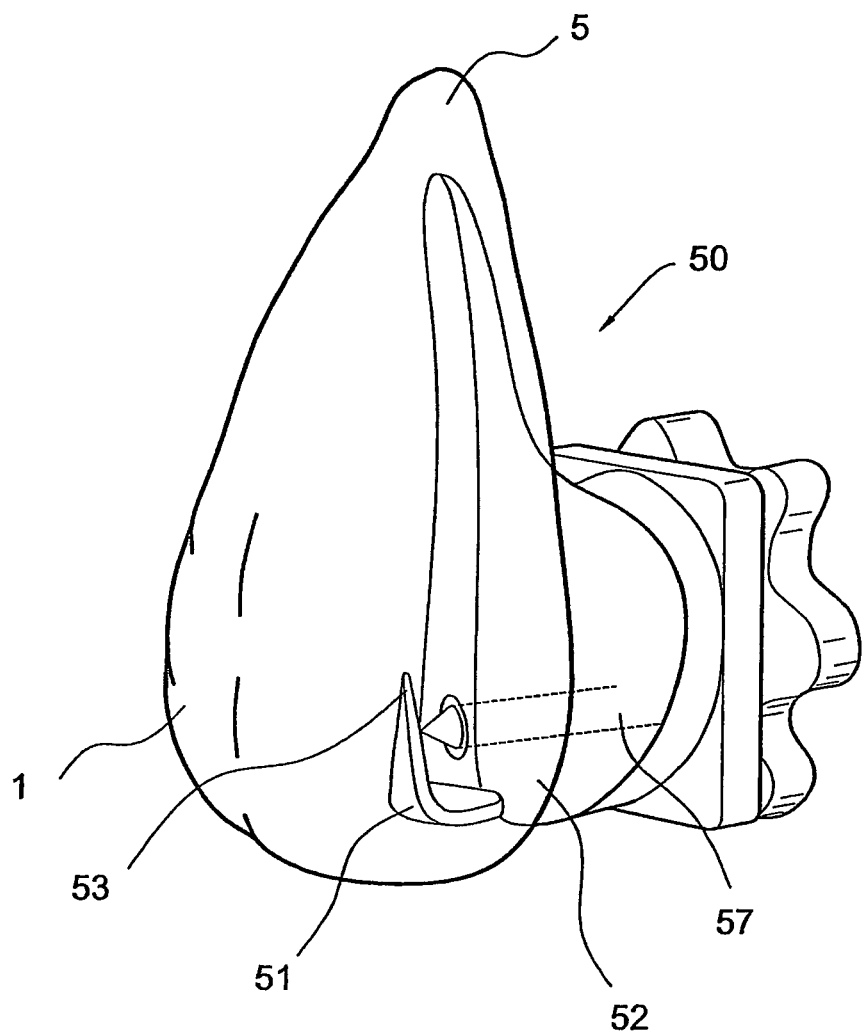
FIG. 2 shows a breast cap placed on a product carrier.

Product carriers 50 which are suitable for breast caps 1 are often provided with a hook 51 (see FIG. 2 and FIG. 3). This hook 51 preferably acts on the breastbone in order to fix the breast cap relative to the product carrier. The product carrier 50 is further provided with a support surface 52 against which a breast cap 1 arranged on the product carrier 50 lies. The pin 57 ensures that the breast cap 1 sits securely in the hook 51.

Figures 3A, 3B:
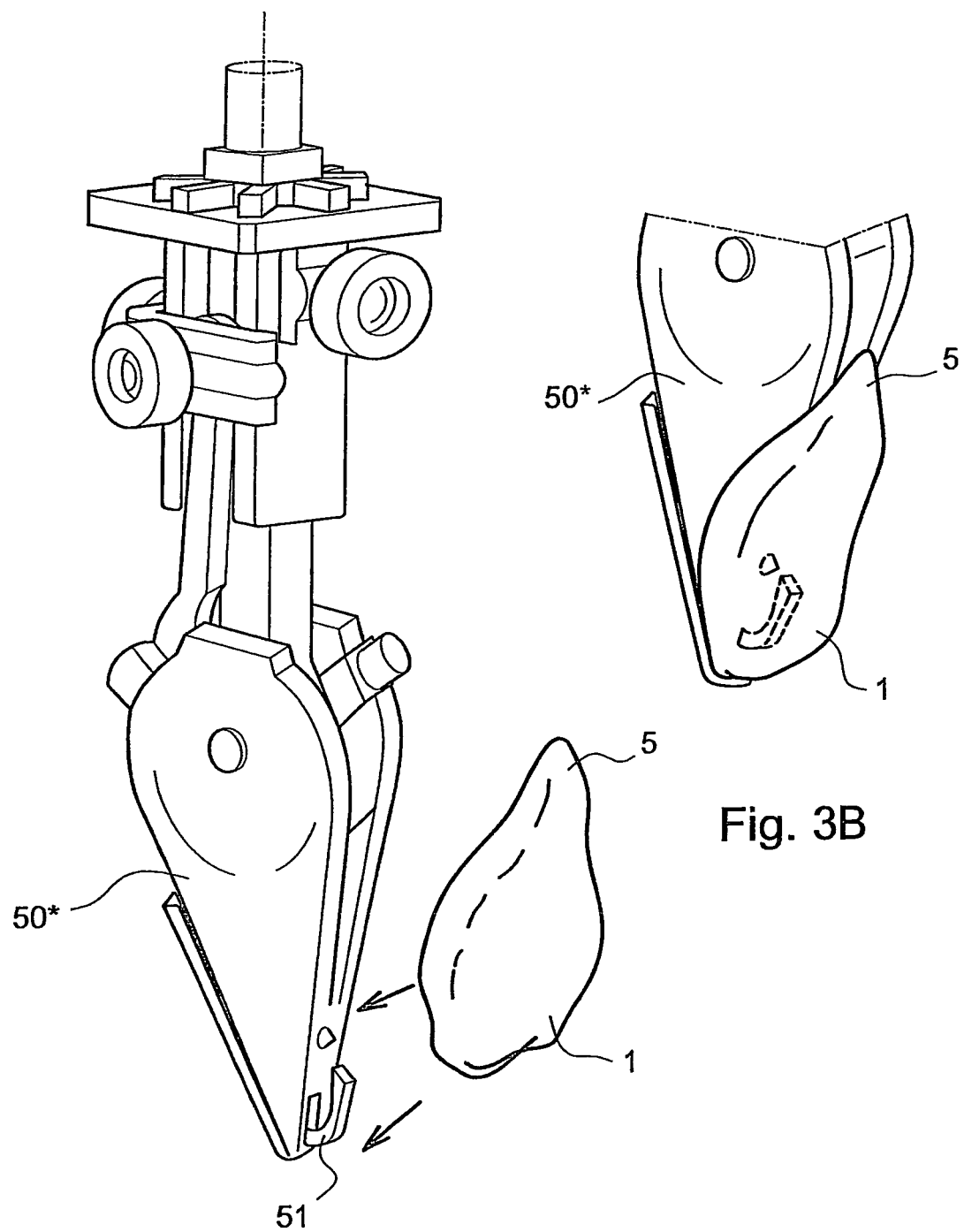
FIG. 3 shows a combination of a breast cap with an alternative product carrier.

The person skilled in the art is familiar with various sorts of product carriers 50 which are suitable for carrying a breast cap. Product carriers of this type are known for example from EP 0254332 and from NL 1014845. FIG. 3A shows the arrangement of a breast cap 1 on an alternative product carrier 50*, and FIG. 3B shows a breast cap 1 arranged on a product carrier 50* of this type.

Figure 4A:
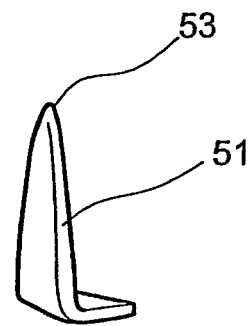
FIG. 4 shows two variants of a hook of a product carrier.
Figure 4B:
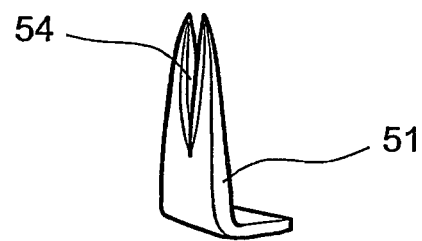

The hook 51 can have various shapes, as shown in FIG. 4A and FIG. 4B. The shape with the single tip 53 is common, but it is also possible to provide the hook 51 with a V shape 54. This V shape 54 can receive a tendon connected to the breastbone, thus allowing the breast cap 1 to be positioned well on the product carrier 50.

Figure 5:
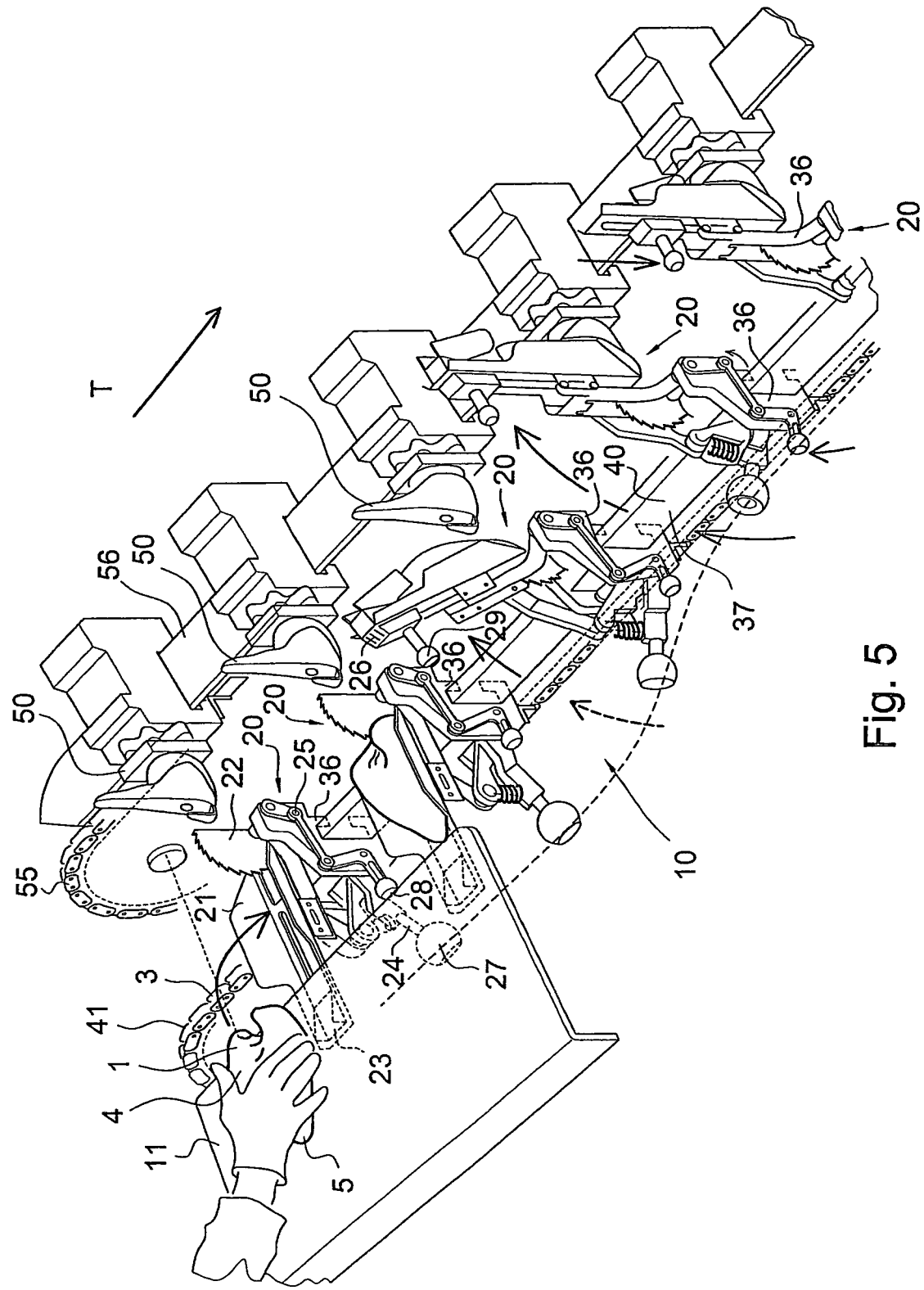
FIG. 5 shows a first example of an embodiment of a system comprising a device according to the invention.

FIG. 5 shows an example of an embodiment of a system comprising a device 10 according to the invention.

The system from FIG. 5 comprises a feed plate 11, a plurality of set-up units 20 and a plurality of product carriers 50. The product carriers 50 are conveyed in the direction of transportation T by a drive 55 along a track 56. The set-up units 20 are in this embodiment conveyed along a track 40, driven by the drive 41.

Figure 6A:
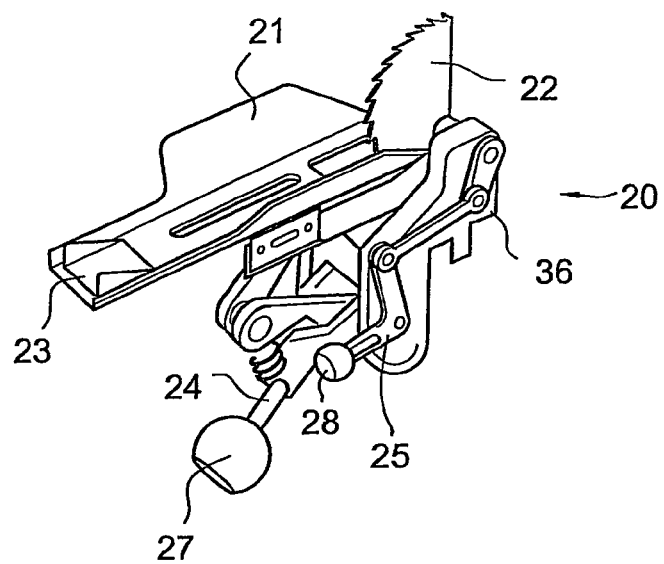
FIG. 6 shows an application unit of the device according to FIG. 5.
Figure 6B:
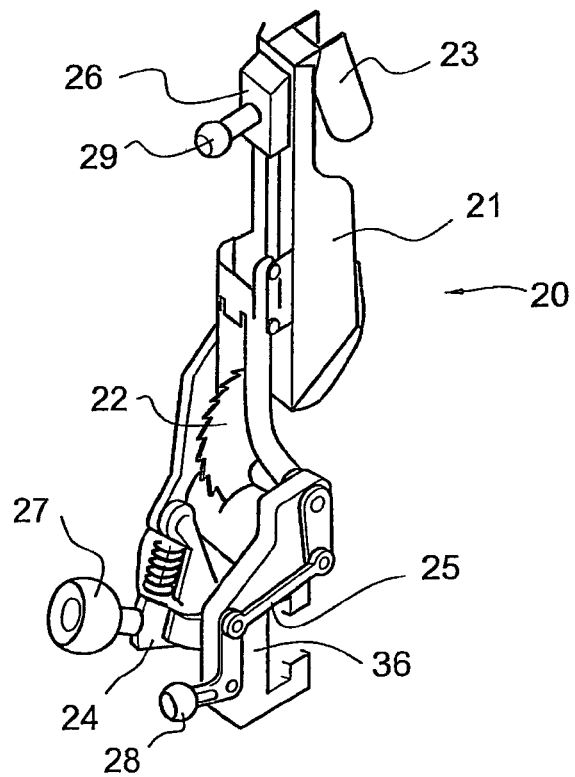
Figure 11:
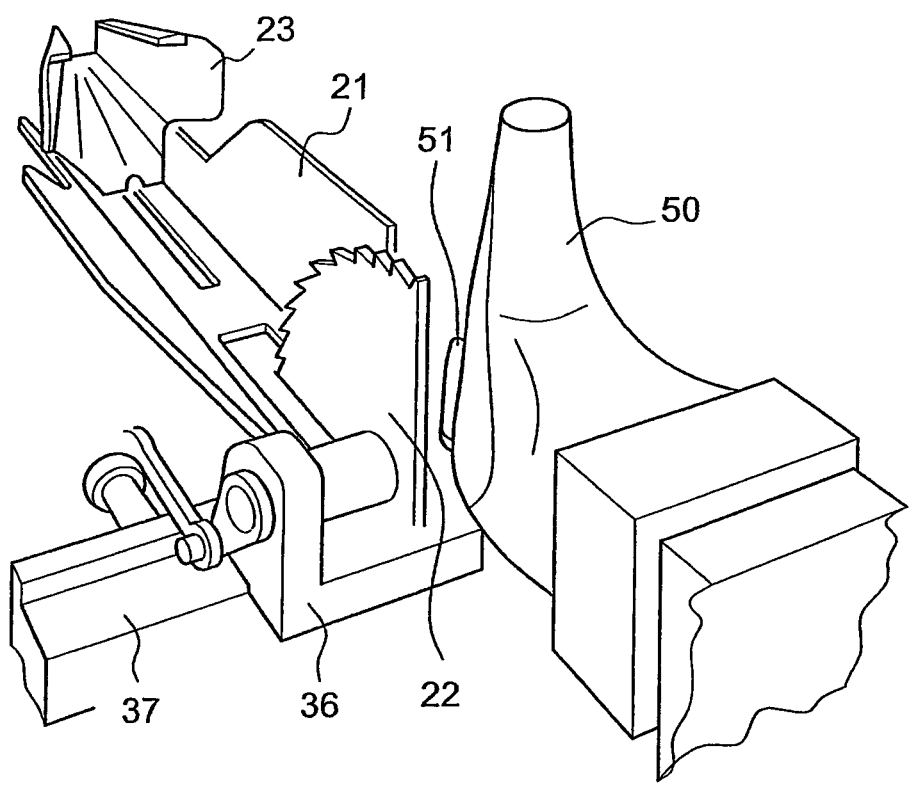
FIG. 11 shows an application unit of the first embodiment in the receiving position.
Figure 12:
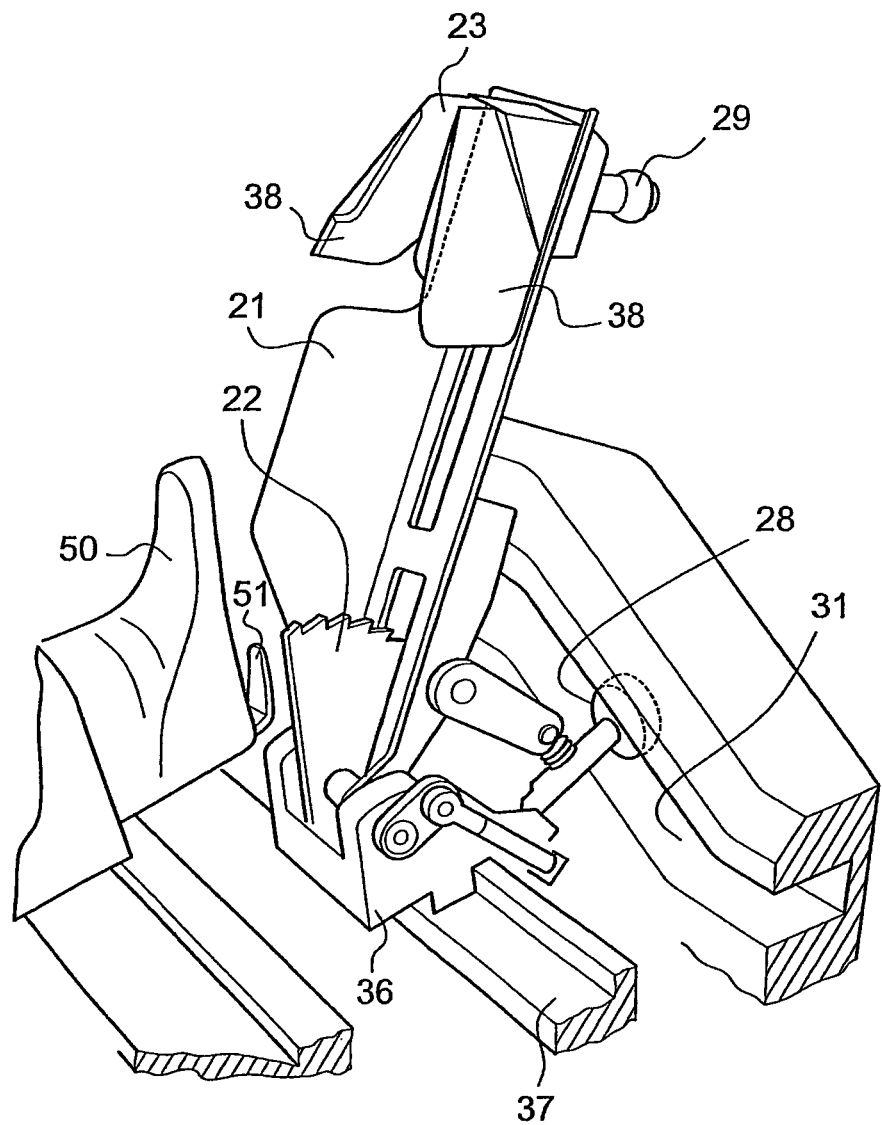
FIG. 12 shows the application unit from FIG. 11 in the transfer position.
Figure 13:
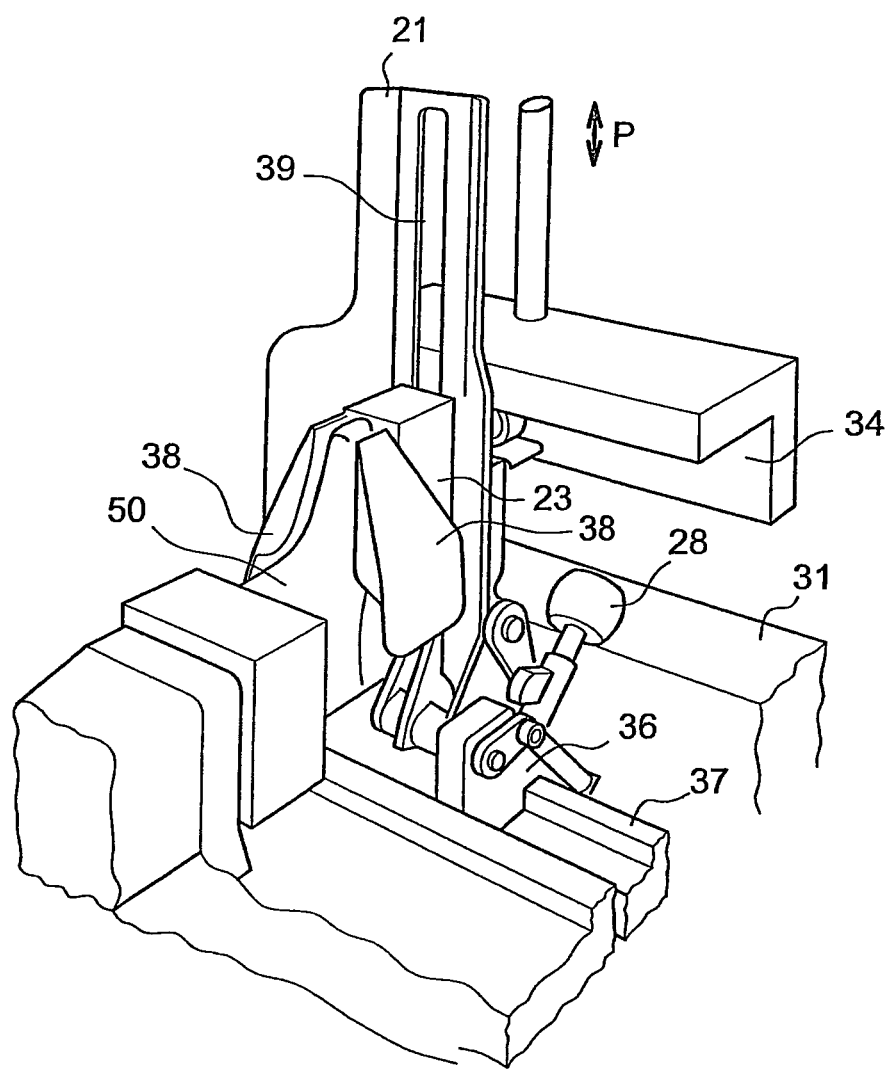
FIG. 13 shows the application unit from FIG. 11 in a position in which a breast cap can be pressed onto the product carrier.

FIG. 6 shows an application unit in greater detail. In this case, FIG. 6A shows the application unit in the receiving position and FIG. 6B shows the application unit in the transfer position. FIGS. 11, 12 and 13 also show an application unit.

In the system according to FIG. 5, breast caps 1 are supplied by a supply device (not shown). The supply device can for example be a conveyor belt, a vibrating trough, a walking beam, a chute or a tray. An operator picks up a breast cap 1 from the supply device and lays it on the feed plate 11, with the back 4 directed upward and the neck side 3 turned away.

The operator slides or lays the breast cap 1 in an application unit 20 via the feed plate 11. In an alternative embodiment of the system according to FIG. 5, the actions performed by the operator are carried out by a robot or using other mechanical means.

The application unit 20 comprises a holder 21, a neck support 22 and a pressing member 23. In the embodiment shown, the holder 21 and the neck support 22 can each, independently of each other, pivot relative to the track 40 along which the set-up units 20 are movable. The pressing member 23 is slideable relative to the holder 21. In order to carry out these movements, the application unit comprises a holder tilting mechanism 24, a neck support tilting mechanism 25 and a pressing member movement mechanism 26 respectively. Each of these mechanisms is actuated by a cam track over which a cam roller 27, 28, 29 runs. For the sake of clarity, the cam tracks are not shown in FIG. 5. The components of the application unit 20 are mounted on a base part 36. The base parts 36 are in this example guided along a base part guide 37, so that the set-up units follow the track 40.

In the application unit shown in FIGS. 11, 12 and 13, the application member 23 has two pressing surfaces 38 which are set apart from each other and arranged to engage on either sides on the breast cap. In this example, the pressing surfaces 38 are arranged in such a way that they engage in proximity to the breast point. The pressing surfaces 38 are arranged substantially in an inverted V shape.

In the example from FIGS. 11, 12 and 13, the pressing member movement mechanism 26 is provided with a guide 39 for guiding the pressing member 23 along the holder 21.

FIG. 7 shows an example of an embodiment of the method according to the invention, suitable to be carried out using the system according to FIG. 5.

Figure 7A:
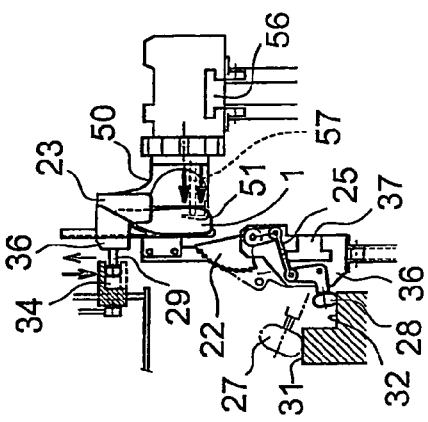
FIG. 7 shows an example of an embodiment of the method according to the invention, suitable to be carried out using the system according to FIG. 5.

FIG. 7A shows a first step in the method. An operator has picked up a breast cap 1 from the supply device and lays it on the feed plate 11. The breast cap 1 is laid on the feed plate 11 in such a way that the back 4 is directed upward, the front 2 rests on the feed plate 11, the neck side 3 is directed away from the operator and the breast point 5 is directed towards the operator.

As can also be seen in FIG. 5, the pitch between successive set-up units 20 is substantially equal to the pitch between successive product carriers 50. Preferably, the set-up units 20 and the product carriers 50 move at the same speed in the direction of transportation T. This movement can be continuous or stepwise.

In the step of FIG. 7A, the application unit 20 is in the receiving position.

Figure 7C:
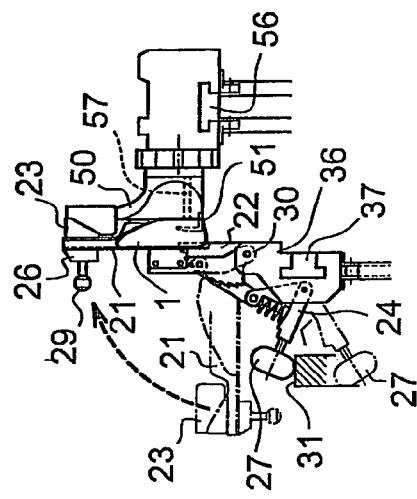
Figure 7E:
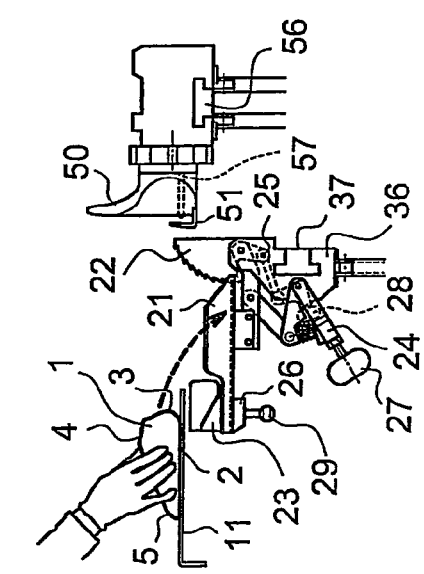
Figure 7F:
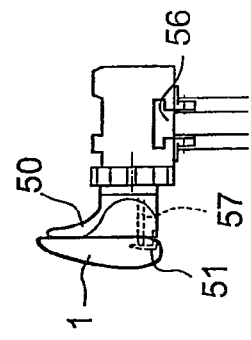
Figure 7D:
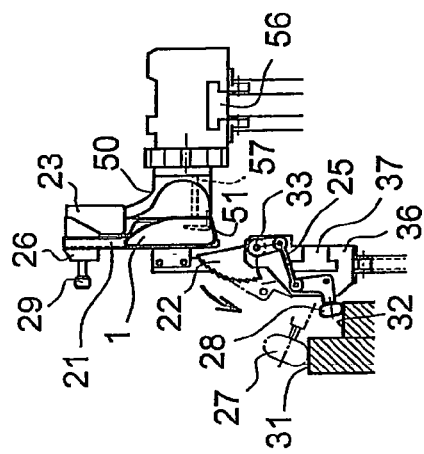
Figure 7B:
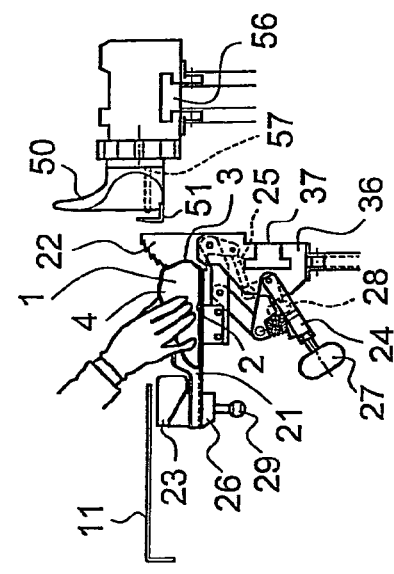

FIG. 7B shows a second step in the method. Also now, the application unit is still in the receiving position. In this step of the method, the operator lays the breast cap 1 in the holder 21 of the application unit 20. In this case too, the back 4 of the breast cap 1 is directed upward, the front 2 rests on the holder 11, the neck side 3 is directed away from the operator and the breast point 5 towards the operator. Preferably, the operator lays the breast cap in the holder 21 in such a way that the neck side 3 of the breast cap lies against the neck support 22. Laying the breast cap 1 in the holder 21 of the application unit requires no or little force to be exerted by the operator. This is in contrast to the known manual manner of arranging breast caps on product carriers.

In this example, the neck support 22 is embodied in the form of an upright plate. As a result, the surface where the neck side 3 of the breast cap 1 lies against the neck support 22 is fairly narrow. By causing the neck support 22 to engage at the point of the V shape 6 of the neck side 3 of the breast cap 1, the neck side 3 of the breast cap 1 is positioned (preferably centred) in the holder 21. Further centring is achieved if the holder 21 has a V-shaped cross section. This can thus centre the breast cap 1 over its entire length in the holder 21. Causing the neck side 3 of the breast cap 1 to lie against the neck support 22 also ensures correct positioning of the breastbone of the breast cap 1 relative to the holder 21, both in the longitudinal direction and in the transverse direction of the breast cap 1. In an alternative embodiment (not shown), the neck support can be configured as a flat plate which, in use, extends substantially transversely to the breast cap. A neck support of this type positions the breast cap in its longitudinal direction but not in its transverse direction relative to the holder.

It will be clear to the person skilled in the art that desired positioning of the breast cap 1 in the holder 21 can also be obtained in other manners, for example by way of a V-shaped neck support.

In the step of FIG. 7B, the pressing member 23 is not yet in contact with the breast cap 1. It is possible to provide the pressing member with a lock which locks the position of the pressing member in this phase of the process relative to the holder 21.

FIG. 7C shows a third step in the method. In this third step, the holder 21 is tilted about the pivot shaft 30 from the receiving position (indicated by broken lines) to the transfer position (indicated by solid lines). This movement is actuated via the cam track 31, cam roller 27 and holder tilting mechanism 24. The neck support 22 remains in the same position as during the first and the second step of the method. For the sake of clarity, the neck support tilting mechanism is not shown in FIG. 7C.

In the example of FIG. 7C, the pressing member 23 is still locked relative to the holder 21 during this step of the method. It is however also possible for any locking to be cancelled between the situation of FIG. 7B and that of FIG. 7C or for no lock to be present, so that the pressing member 23 already slides downward somewhat along the holder during the tilting of the holder 21 from the receiving position to the transfer position and comes to lie against the breast cap 1.

Figure 10:
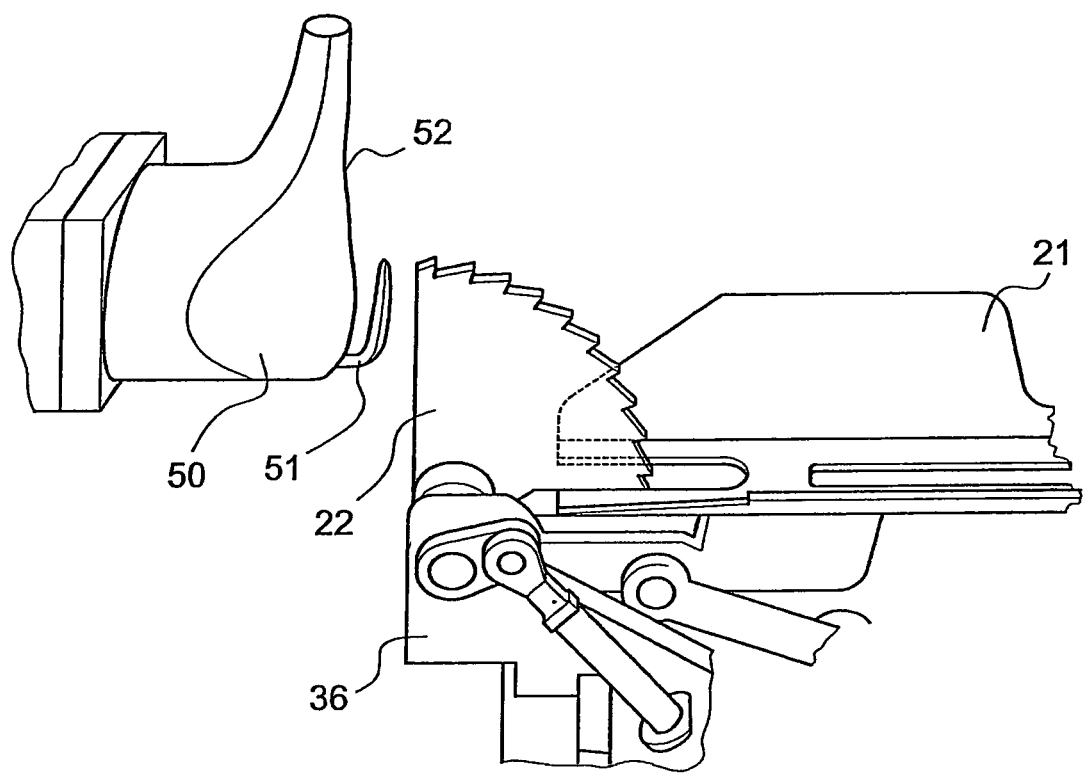
FIG. 10 shows the position of the neck support relative to a hook of a product carrier prior to the transfer of the breast cap from the holder to the product carrier in the first embodiment of a device according to the invention.

The neck support 22 is shaped in such a way that the upper side of the neck support 22 lies at the same level as the top tip of the hook 51 of the product carrier 50 (see also FIG. 10). As a result of the tilting of the holder 21, the breast cap, at the top of the V shape 6 of the neck side 3, is guided by the neck support to a position relative to the product carrier 50 in which the breast cap 1 can be taken over by the product carrier 50. As a result of the fact that the upper side of the neck support 22 lies at the same level as the top tip of the hook 51 of the product carrier 50 (see FIG. 10), the breast cap enters a position in which the breast cap 1 can be transferred to the product carrier 50 in an effective manner. In the transfer position, the back 4 of the breast cap 1 lies against the support surface 52 of the product carrier 50.

In the example of FIGS. 5, 6 and 7, the neck support 22 has a shape which is adapted to the tilting movement of the holder 21. It will however be clear to the person skilled in the art that other shapes of the neck support are also possible.

In the example of FIGS. 5, 6 and 7, the neck support 22 is provided with a toothed surface. This offers the advantage that any tissue—such as skin, membranes or crop parts—present between the neck support 22 and the neck side 3 of the breast cap is pulled away during tilting of the holder 21, so that the neck side 3 comes to lie directly against the neck support 22.

It is however also possible to omit the teeth on the neck support 22.

FIG. 7D shows a fourth step in the method. In this step, the neck support 22 is tilted away about the pivot shaft 33 by the neck support tilting mechanism 25. This mechanism 25 is actuated by the cam track 32 and cam roller 28. The breast cap 1 is now carried loosely by the hook 51 of the product carrier 50. The pin 57 is still retracted in the product carrier 50.

FIG. 7E shows the fifth step in the method. In this step, the pressing member 23 is actively pressed downward. As a result, the pressing member 23 presses the breast cap securely onto the product carrier 50. As a result, the hook 51 preferably enters into engagement with a part of the breastbone or with the tissue in the immediate vicinity of the breastbone.

After the breast cap 1 has been pressed onto the product carrier 50, the breast cap sits securely on the product carrier 50 and the application unit can release the breast cap 1. For this purpose, the pressing member is raised again so that it is no longer engaging the breast cap 1.

Pressing the pressing member down and raising it again can be carried out by a cam track having a profile suitable for this purpose. It is however also possible to cause the cam roller 29 to run in a track 34, and to move this track down and subsequently back up using an actuator. In this case, a pneumatic cylinder is for example suitable to serve as the actuator.

Pressing down the breast cap 1, as a result of which said breast cap comes to sit securely on the product carrier 50, has to date been carried out using manual force. In the method and the device according to the invention, however, this force is supplied by the device, thus preventing excessive physical exertion of operators.

In the method according to FIG. 7, after the breast cap 1 has been pressed down onto the product carrier 50, the pin 57 of the product carrier 50 is slid in the direction of the breast cap. As a result, the pin 57 clamps the breast cap 1 securely against the hook 51.

FIG. 7F shows the final result of the method according to the invention: a breast cap 1 arranged on a product carrier 50.

FIG. 8 is a further detailed view of the arrangement of the breast cap 1 on the product carrier 50. For the sake of clarity, FIG. 8 shows just a few components of the application unit 20.

FIG. 8A shows that the neck support 22 brings the breast cap 1 to the product carrier 50. The broken line 7 indicates the top of the V shape 6 of the neck side 3. The neck support 22 acts on this top 7 and takes it above the top of the hook 51.

FIG. 8B shows that the neck support 22 of the breast cap 1 is tilted away about the pivot shaft 33. The breast cap 1 continues to lie against the product carrier 50. The breast cap 1 is in this case held in position by the holder 21 (not shown in FIG. 8B).

FIG. 8C shows that the pressing member 23 presses the breast cap 1 downward relative to the product carrier 50. As a result, the breast cap 1 is pressed securely onto the hook 51. This is an action which requires a relatively high degree of force and caused injuries to operators in the case of the known method.

FIG. 8D shows a breast cap 1 arranged on the product carrier 50. The pin 57 of the product carrier is extended in the direction of the breast cap 1. As a result, the breast cap is fixed even more securely on the product carrier 50.

Figure 9:
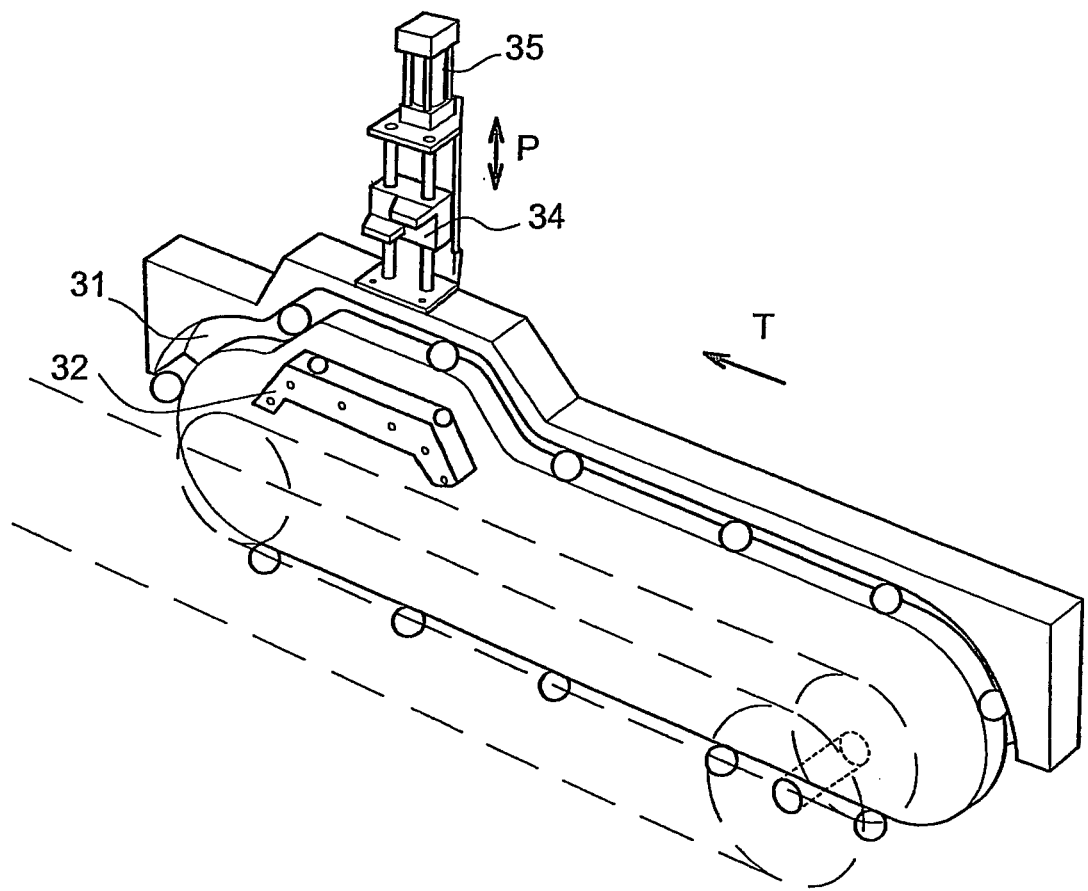
FIG. 9 shows the cam tracks for actuating the application unit.

FIG. 9 shows the cam track 31 for actuating the tilting of the holder 21, the cam track 32 for actuating the tilting of the neck support 22 and the track 34 for activating the movement of the pressing member 23. The track 34 interacts with the pneumatic cylinder 35 which moves the track 34 downward and upward in the direction indicated by arrow P. Arrow T indicates the direction of transportation of the product carriers 50.

FIG. 14 shows a second embodiment of the device and method according to the invention. In the embodiment of FIG. 14, separating line carriers 150 are used as product carriers. Whole carcasses 101 (which are preferably already made ready to cook and have optionally already been cooled) are arranged on these separating line carriers 150.

In this exemplary embodiment, the application unit 120 comprises a holder 121 which is adapted for receiving a whole carcass 101. Preferably, the holder 121 is shaped in such a way that the carcass 101 is positioned in the holder 121 in an unambiguous manner. In the example of FIG. 14, the holder 121 is provided with oblique sides 123 which ensure that the carcass 101 is longitudinally centred in the holder 121.

The holder 121 is also provided with recesses 122 in which the wings 102 (or the parts of the wings 102 that are present) can be received. These recesses 122 thus help to position the carcass 101 relative to the holder 121.

The holder 121 is mounted on a base part 136 which is movable along a base part guide 137. The holder 121 is pivotable relative to the base part 136 about the pivot shaft 130.

The example of FIG. 14 includes a feed plate 111 which is placed in such a way that an operator 112 or a robot can easily lay a carcass 101 in the holder 121 of an application unit 120 from the feed plate 111 when the holder 121 is in the receiving position.

FIG. 14 shows various steps in the use of the second exemplary embodiment of the device according to the invention. FIG. 14A shows the first step in which a carcass 101 is laid on the feed plate 111, with the back on the plate and the breast facing upward. The neck side of the carcass part 101 points towards the application unit 120 and the legs point away from the application unit 120. The holder 121 of the application unit 120 is in the receiving position. The positions of the feed plate 111 and the holder 121 are adapted to each other in such a way that an operator 112 can easily slide the carcass 101 from the feed plate 111 into the holder (see arrow P1).

An overhead transportation track comprising a plurality of product carriers in the form of separating line carriers 150 is provided. This overhead transportation track, along which the separating line carriers 150 can be moved in the direction of transportation T by a drive system, is positioned in such a way that a carcass 101 can be transferred from a holder 121 which is in the transfer position to a separating line carrier 150.

It is envisaged that the application unit 120 can to move along a base part guide 137. In that case, a drive is provided for this purpose (not shown), for example in the same way as shown in combination with the first exemplary embodiment. In many modern slaughterhouses, the overhead transportation track comprising the separating line carriers 150 will move continuously at a substantially fixed speed. By moving the application unit 120 at the same speed along the base guide part 137, a carcass 101 can be attached in a separating line carrier 150 relatively easily. It is however also possible for the separating line carriers to move intermittently. In that case, the carcass 101 can be transferred from the application unit 120 to the separating line carrier 150 while the separating line carriers 150 are stationary. Such a combination of a system comprising a device according to the invention and a continuously or intermittently moving transportation system is possible with all the described variants of the device according to the invention.

FIG. 14 shows just a single application unit 120. However, an advantageous variant provides a plurality of set-up units which are preferably placed at a fixed mutual distance, which mutual distance corresponds to the mutual distance of the product carriers in which or on which the carcass 101 is arranged.

Figure 14A:
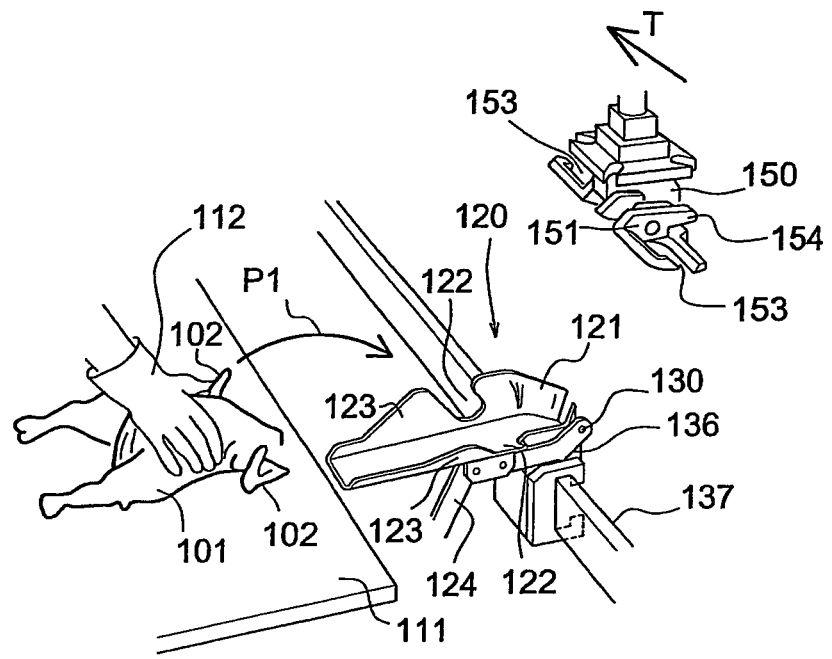
FIG. 14 shows a second embodiment of the device and method according to the invention.
Figure 14B:
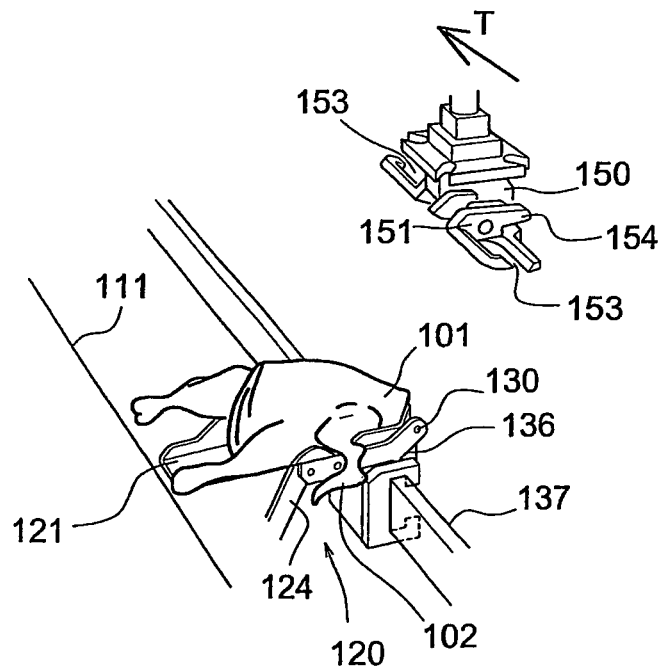

FIG. 14B shows a following step. The carcass 101 to be suspended from the separating line carrier is now arranged in the holder 121 of the application unit. The wings 102 lie in the recesses 122 in the holder 121. The position of the carcass 101 relative to the longitudinal direction of the holder 121 is thus defined. The upright sides 123 of the holder 121 centre the carcass 101 in the holder 120.

The separating line carrier 150 contains a lock 151 which has an open and a closed position. In the open position, it is possible to arrange a carcass 101 (or a carcass part such as a leg) in the separating line carrier 150 or to remove it from the separating line carrier 150. In the closed position, a carcass (or carcass part) which is present sits in the separating line carrier 150 in a locking manner. The lock is operated by an operating member which is arranged next to the overhead transportation track.

In the situation of FIG. 14B, the lock 151 of the separating line carrier 150 is open.

Figure 14C:
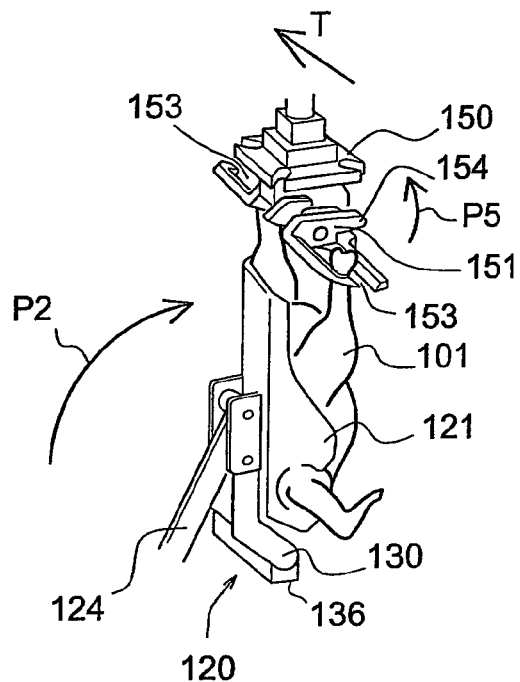
Figure 14D:
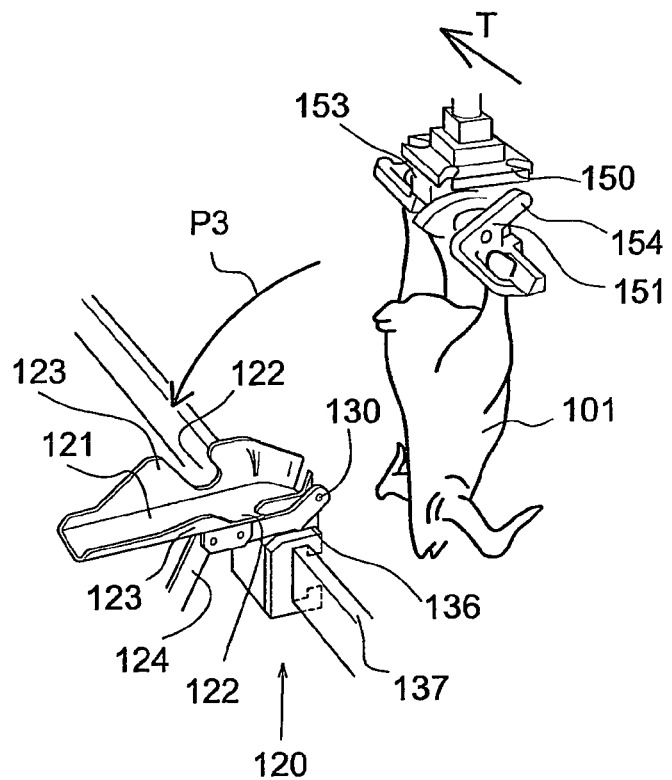

From the situation of FIG. 14B, the holder tilting mechanism 124 swivels the holder 121 from the receiving position (FIG. 14B) about the pivot shaft 130 to the transfer position (FIG. 14C), for example in the direction indicated by arrow P2 (see FIG. 14C). During the swivelling of the holder 121, the wings 102 of the carcass 101 come to lie against the edge of the recesses 122 under the force of gravity. This positions the carcass 101 relative to the holder 121.

For the sake of clarity, a number of components of the device according to the invention are omitted in FIG. 14C.

In the position shown in FIG. 14C, the legs of the carcass 101 are brought into the leg slots 153 in the separating line carrier 150, for example by means of a guide (not shown) for the legs. When the legs are in the desired position, the lock 151 is closed. This takes place by moving the lever 154 upward, for example in the direction indicated by arrow P5. The upward movement of the lever 154 can for example be achieved by a cam track which is arranged along the suspended transportation track and guides the lever.

When the lock 151 of the separating line carrier 150 is closed, the carcass 101 is securely suspended from the separating line carrier 150. The holder 121 can now be swivelled back from the transfer position (FIG. 14C) to the receiving position (see FIG. 14D), for example in the direction indicated by arrow P3. The application unit is then ready again to receive a following carcass 101. If necessary or desired, the application unit is for this purpose first brought back to a suitable position relative to the feed plate 111.

FIG. 15 shows a variant of the device and method according to FIG. 14. In FIG. 15, the carcass 101 is suspended not from a separating line carrier 150 but from a cooling line carrier 155. In FIGS. 14 and 15, corresponding components are denoted by corresponding reference numerals.

The variant of FIG. 15 and the variant of FIG. 14 work in corresponding ways. The variant of FIG. 15 is particularly suitable for use in the case of whole carcasses 101 which are made ready to cook.

Figure 15A:
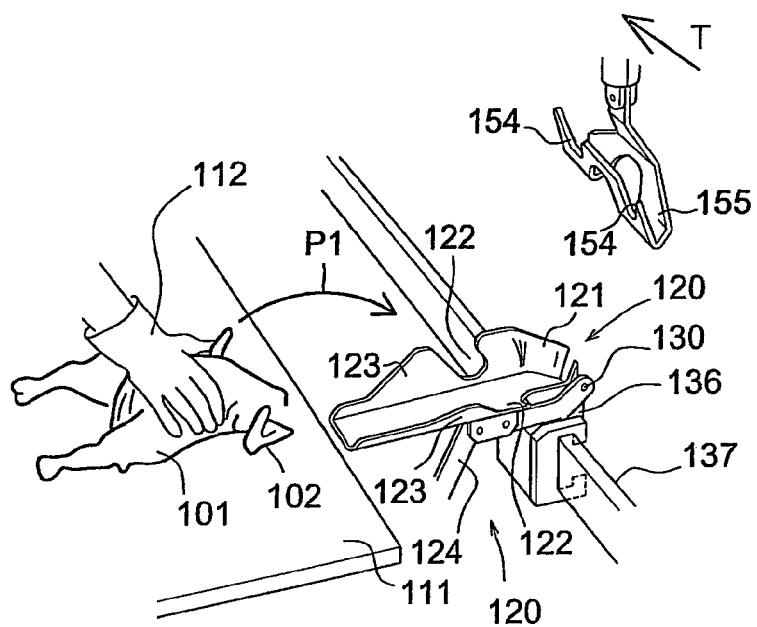
FIG. 15 shows a variant of the embodiment of the device and method according to FIG. 14.
Figure 15B:
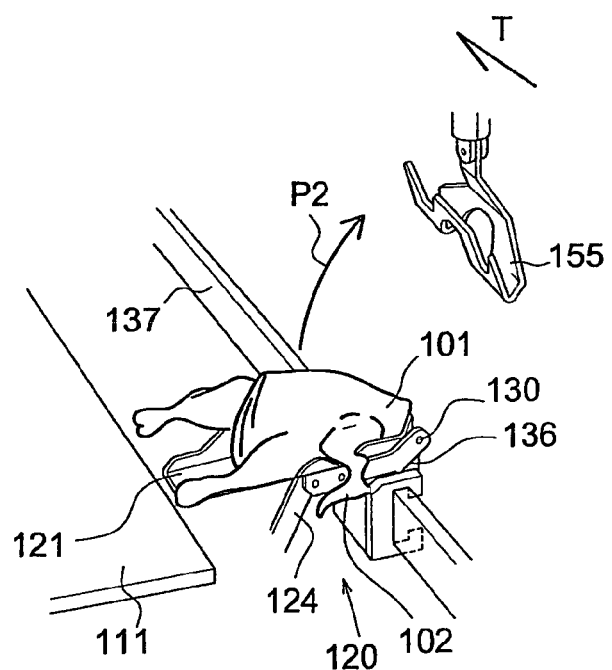
Figure 15C:
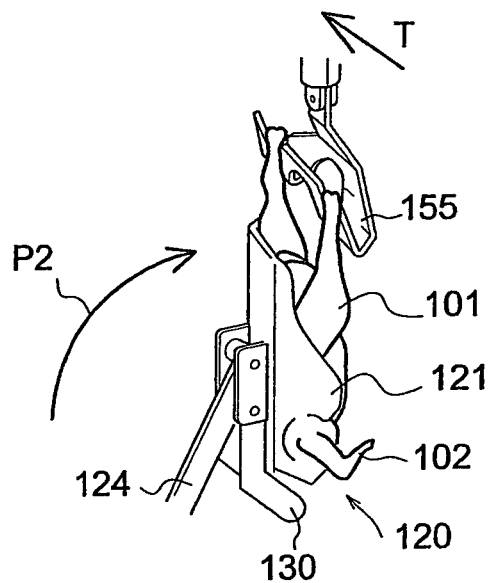
Figure 15D:
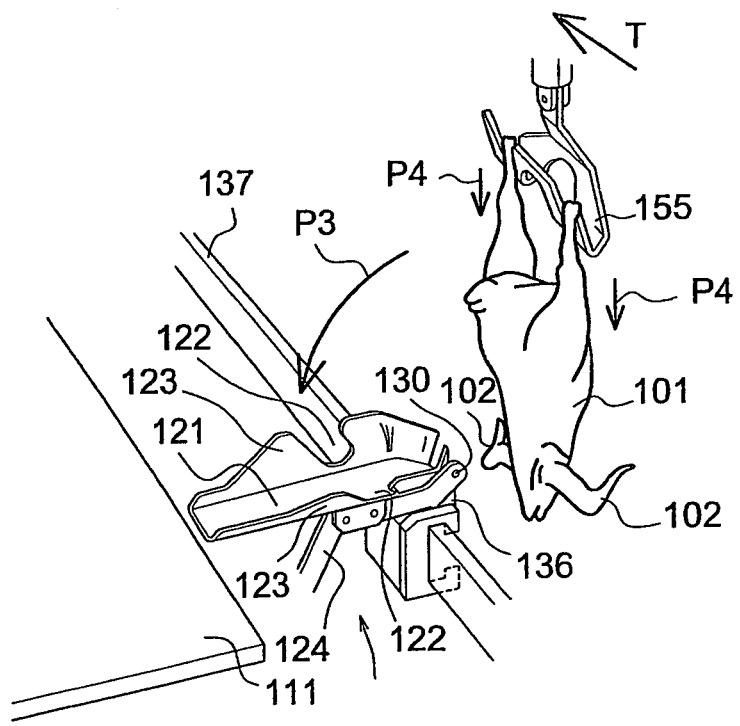

During the arrangement of the carcass 101 in the cooling line carrier 155, the legs are first arranged, as shown in FIG. 15C, in the wide parts of the leg slots 154 in the cooling line carrier 155. During the swivelling-back of the holder 121, the carcass 101 falls downwards under the force of gravity in the direction indicated by arrows P4, as a result of which the legs enter the narrow part of the leg slots 154.

FIG. 16 shows a third embodiment of the device and method according to the invention. This third embodiment corresponds to a high degree to the embodiment of FIG. 14, insofar as in the embodiment according to FIG. 16 the application unit 120 has a holder 221 which is suitable for receiving a back half 105. In FIGS. 14 and 16, corresponding components are denoted by corresponding reference numerals.

Figure 16A:
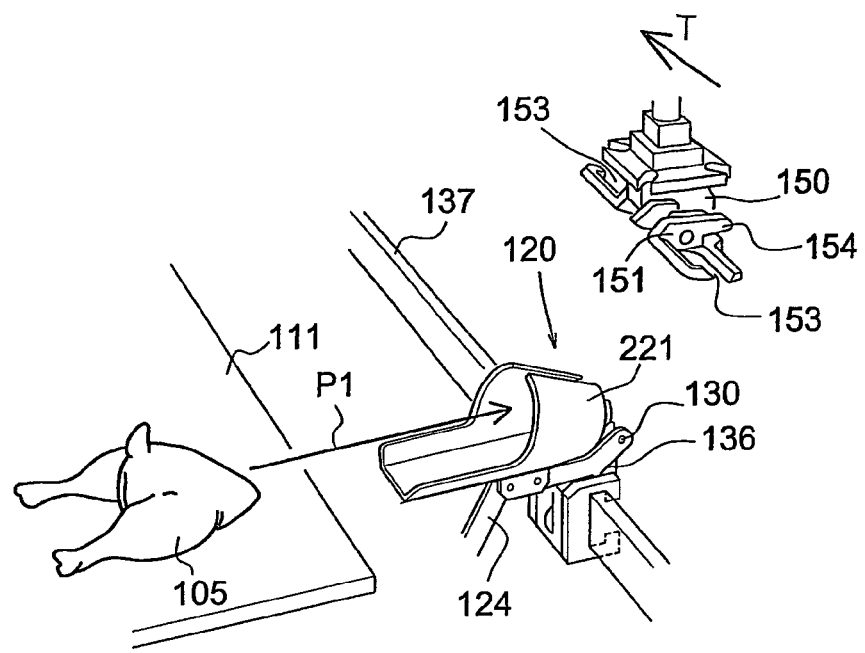
FIG. 16 shows a third embodiment of the device and method according to the invention.
Figure 16B:
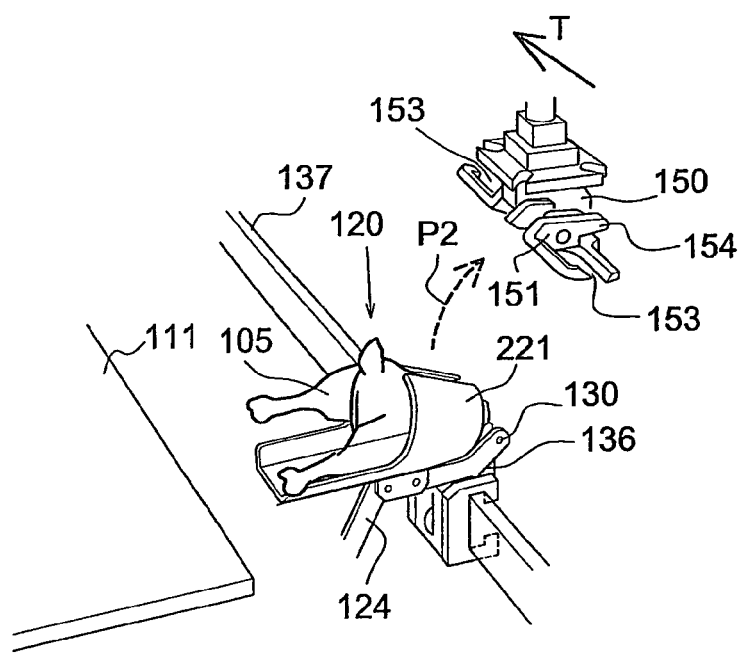

FIG. 16A and FIG. 16B show the same steps for a back half 105 as FIG. 14A and FIG. 14B show for a whole carcass 101.

Figure 16C:
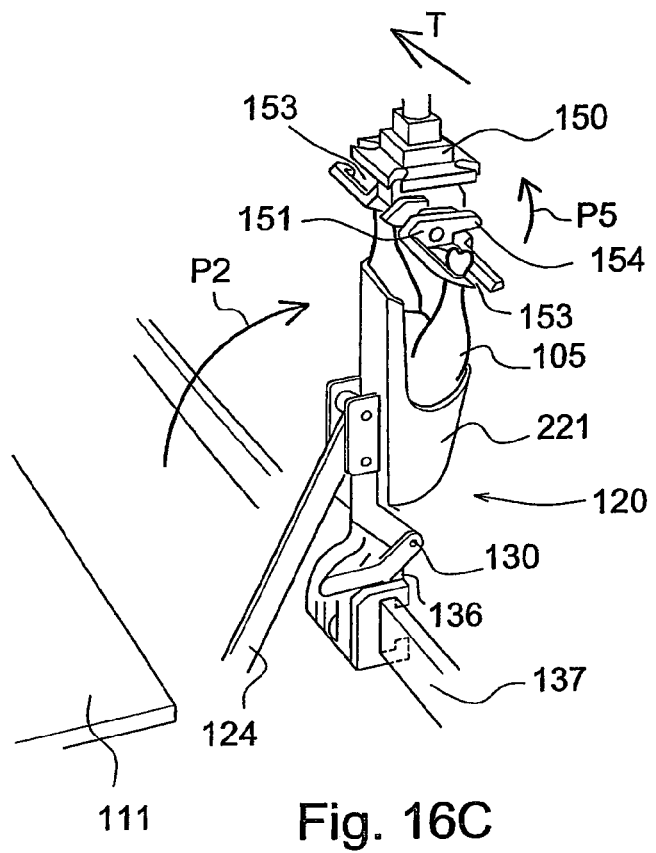
Figure 16D:
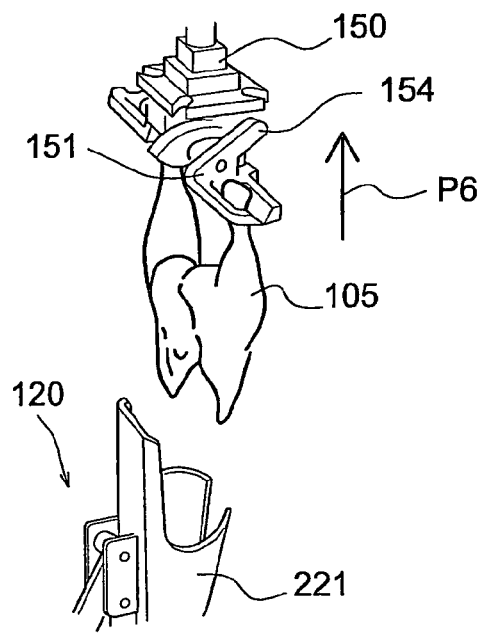

FIG. 16C shows the transfer of the back half 105 from the application unit 120 comprising the holder 221 to the separating line carrier 150. However, in the embodiment of FIG. 16, the back half 105 cannot be released from the holder 221 by the tilting-away of the holder 221, such as is the case in FIG. 14C and FIG. 14D in the holder 121. In the variant of FIG. 16, the separating line carrier 150 is moved upward (arrow P6 in FIG. 16C) relative to the holder 221, for example by causing the path of the overhead transportation track, from which the separating line carriers 150 are suspended, to run upward relative to the device according to the invention. This draws the back half 105 out of the holder 221.

FIG. 17 shows a fourth embodiment of the device and method according to the invention.

Again, corresponding components are denoted by corresponding reference numerals. The functioning of this embodiment is broadly the same as that of the embodiments described hereinbefore.

In this embodiment, a front half 106 is arranged on a product carrier in the form of a carrying block 350. The carrying block 350 engages on the inside of the front half 106. The carrying block 350 is preferably connected to an overhead transportation track.

In the exemplary embodiment of FIG. 17, the holder 321 is suitable for receiving a front half 106. The front half 106 is in this example arranged in the holder 321 with its neck side directed away from the carrying block 350 (arrow P1 in FIG. 17A). The holder 321 is shaped in such a way that the front half 106 is well positioned in the holder and thus relative to the carrying block 350.

Figure 17A:
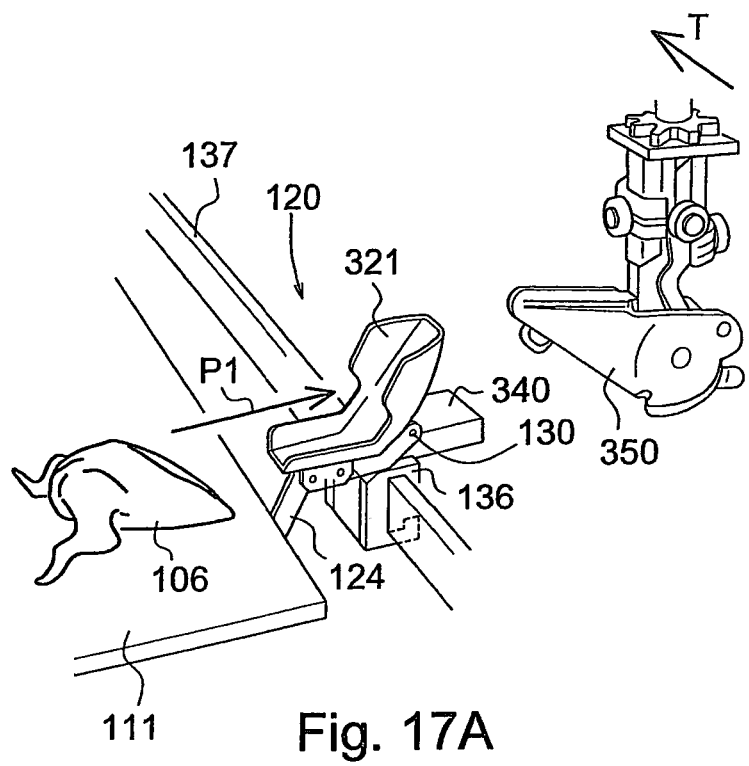
FIG. 17 shows a fourth embodiment of the device and method according to the invention.
Figure 17B:
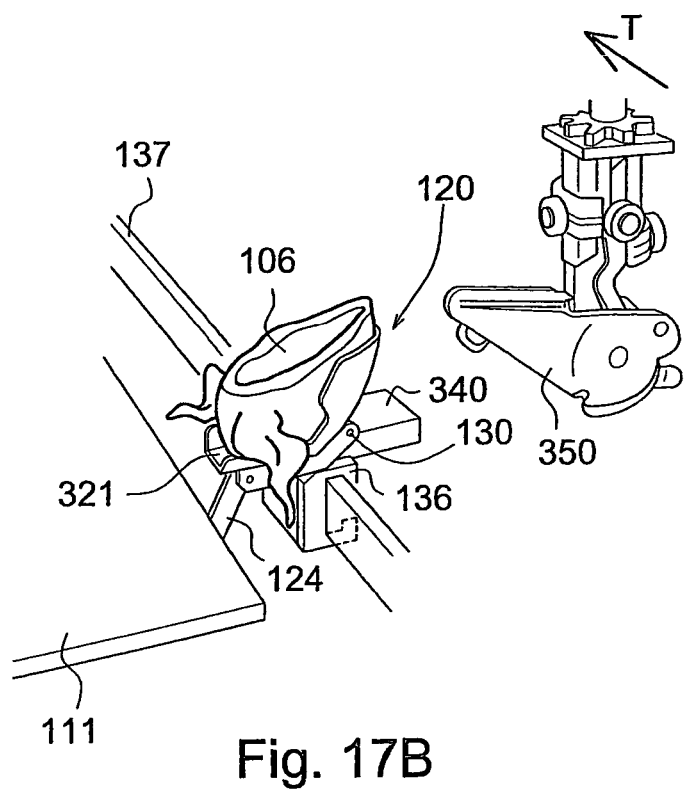

FIG. 17A shows the front half 106 in the holder 321. In FIG. 17B, the holder is still in the receiving position.

Figure 17C:
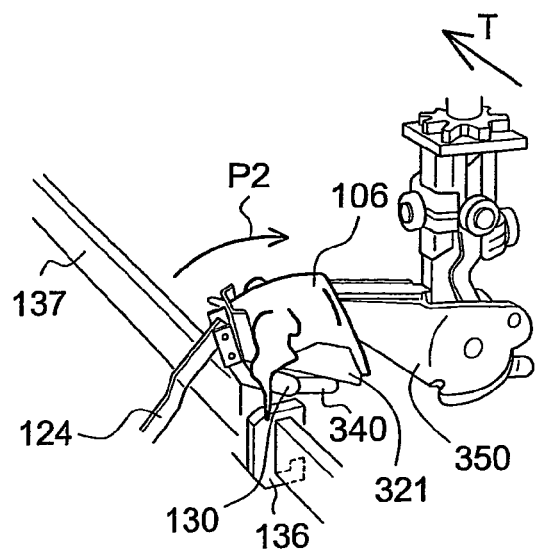
Figure 17D:
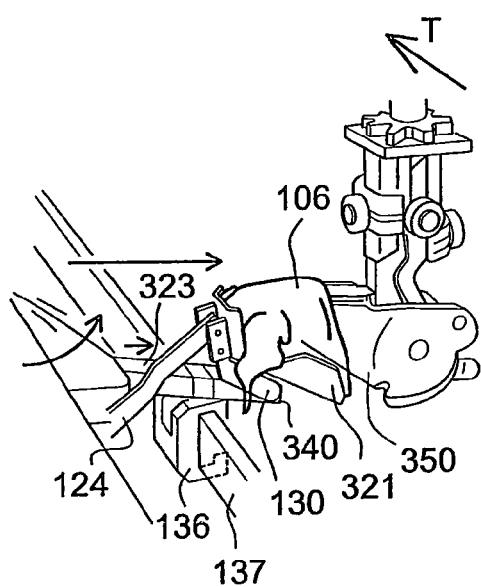

FIG. 17C shows that the holder 321 is tilted with the front half 106 therein. The holder 321 is for this purpose tilted about the pivot shaft 130. The tilting movement is imposed on the holder by the holder tilting mechanism 124, a part of which is shown in FIG. 17C. In the position of FIG. 17C, the front half 106 is substantially aligned with the carrying block 350.

After the tilting of the holder 321, the front half 106 can be slid onto the carrying block. This is carried out by the pressing member 323 (see FIG. 17D). In this exemplary embodiment, the pressing member 323 is arranged below the feed plate 111.

The pressing member 323 presses the holder 321 in the direction of the carrying block 350. The base part 136 comprises a guide block 340 which guides the holder in the direction of the carrying block 350 during this movement. The front half 106 is thus arranged on the carrying block 350. Once the front half 106 is arranged on the carrying block 350, the holder 321 returns to its initial position, such as is shown in FIG. 17A. This can for example take place under the influence of gravity or with the aid of for example pneumatic cylinders or a cam track/cam roller structure.

Figure 17E:
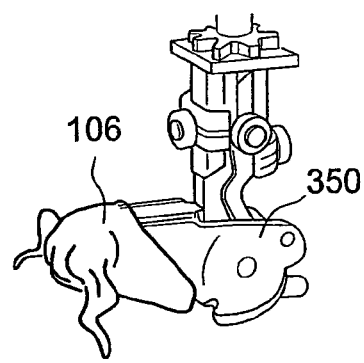

FIG. 17E shows a front half 106 arranged on the carrying block 350.

FIG. 18 shows a fifth embodiment of the device and method according to the invention. In this, embodiment, the holder 421 is suitable for receiving two legs 107 or parts of legs. The holder 421 comprises four side plates 422 which, in pairs, can secure and can position a leg 107.

The functioning of this embodiment is broadly the same as that of the embodiments described hereinbefore. Corresponding components are denoted by corresponding reference numerals.

In the example of FIG. 18, the legs are arranged in a separating line carrier 150. It is however also possible to use a different type of product carrier, for example a cooling line carrier.

In the example of FIG. 18, two legs are arranged in the product carrier at the same time. A person skilled in the art will understand that the embodiment according to FIG. 18 can easily be adapted for a different number of legs.

Figure 18A:
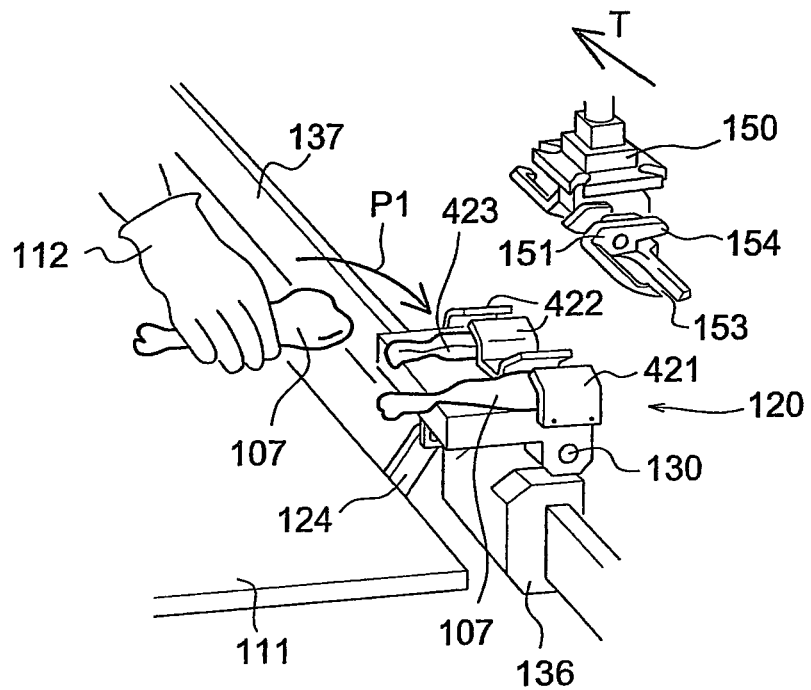
FIG. 18 shows a fifth embodiment of the device and method according to the invention.

FIG. 18A shows that an operator 112 places the legs 107 in the holder 421. Formed in the variant of FIG. 18 are recesses 423, the shape of which corresponds substantially to the shape of a leg 107. This helps to position the leg 107 relative to the holder 421. It is however also conceivable for such a recess 423 not to be provided. This results in a holder 421 which can be produced more inexpensively.

The side plates 422 can be fixedly connected to the remainder of the holder 421, although a variant in which the side plates 422 can pivot relative to the remainder of the holder 421 is also conceivable. The pivot shaft of the side plates 422 then preferably runs substantially parallel to the longitudinal direction of a leg received in the holder. Preferably, a torsion spring, for example, then exerts a spring force on the side plates 422, pressing the side plates towards the remainder of the holder 421. In such a variant, the natural variation in leg thicknesses which occur can be effectively accommodated.

Figure 18B:
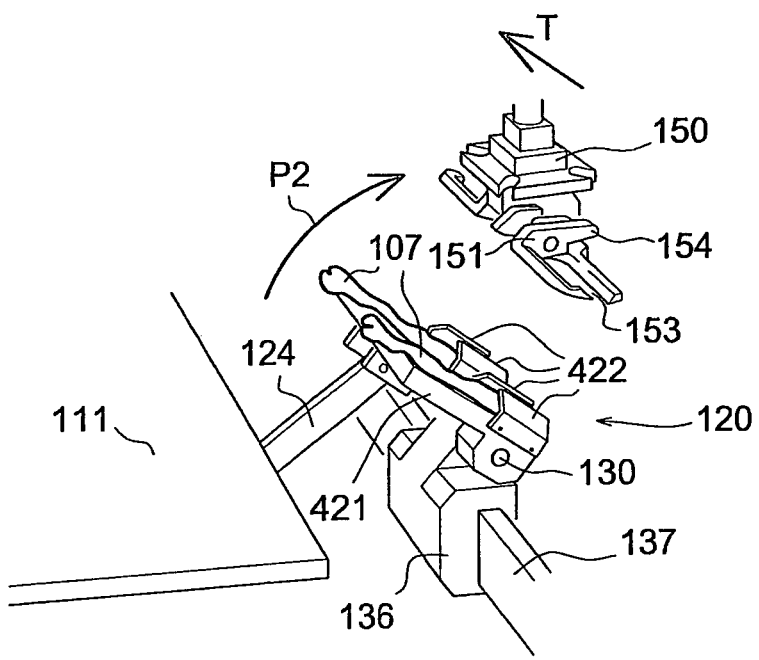

FIG. 18B shows the tilting of the holder 422 from the application position to the transfer position. In this case, the holder 421 pivots about the pivot shaft 130.

Figure 18C:
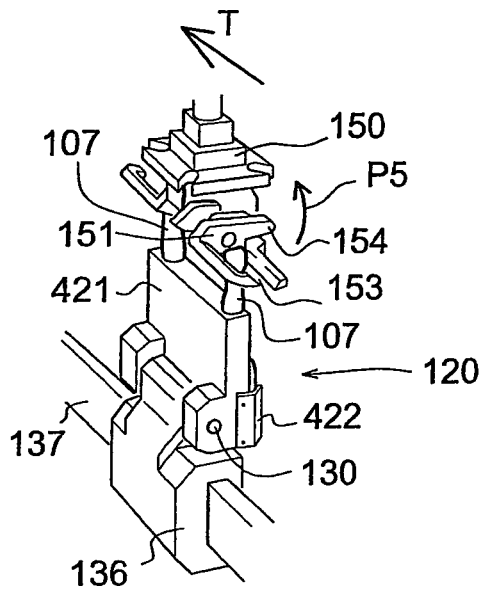
Figure 18D:
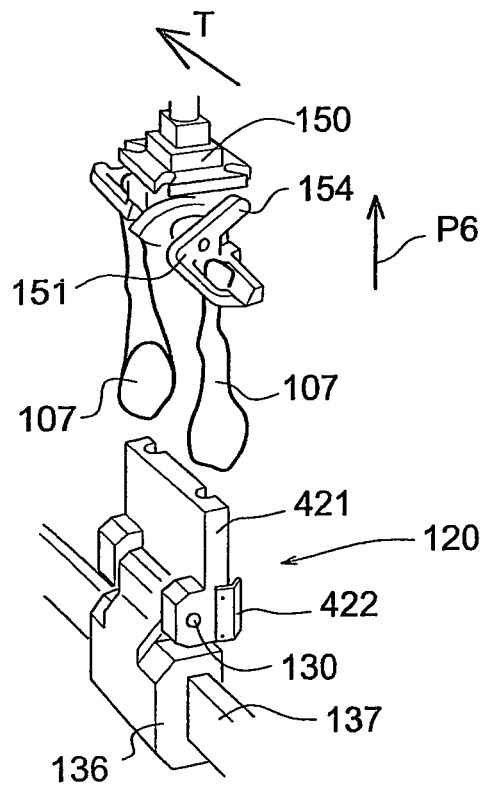

In FIG. 18C, the holder 421 has entered the transfer position. The tips of the legs 107 have arrived in the leg slots 153 in the separating line carrier 150, for example by means of a guide (not shown) for the legs. The lock 151 of the separating line carrier 150 is closed by raising the lever 154 in the direction indicated by arrow P5. This raising is for example achieved by guiding the separating line carrier 150 along a cam track (not shown). The person skilled in the art is familiar with this principle.

The legs 107 can be released from the holder in various ways. It is possible to move the separating line carrier 150 upward in the direction of arrow P6 in FIG. 18D relative to the holder 421, for example by causing the path of the overhead transportation track, from which the separating line carriers are 150 suspended, to run upward relative to the device according to the invention. If, however, the holder is configured with pivotable side plates 422, the legs 107 are simply released from the holder 421 by tilting the holder 421 back to the receiving position.

FIG. 19 shows a sixth embodiment of the device and method according to the invention. In this embodiment, carcass parts, in this example legs 107 or parts thereof, are arranged in a marinating hook 550. With a somewhat adapted holder, this embodiment is also suitable for the arrangement of other carcass parts, for example wings or parts of wings, on hooks of this type.

The functioning of this embodiment is broadly the same as that of the embodiments described hereinbefore. Corresponding components are denoted by corresponding reference numerals.

Figure 19A:
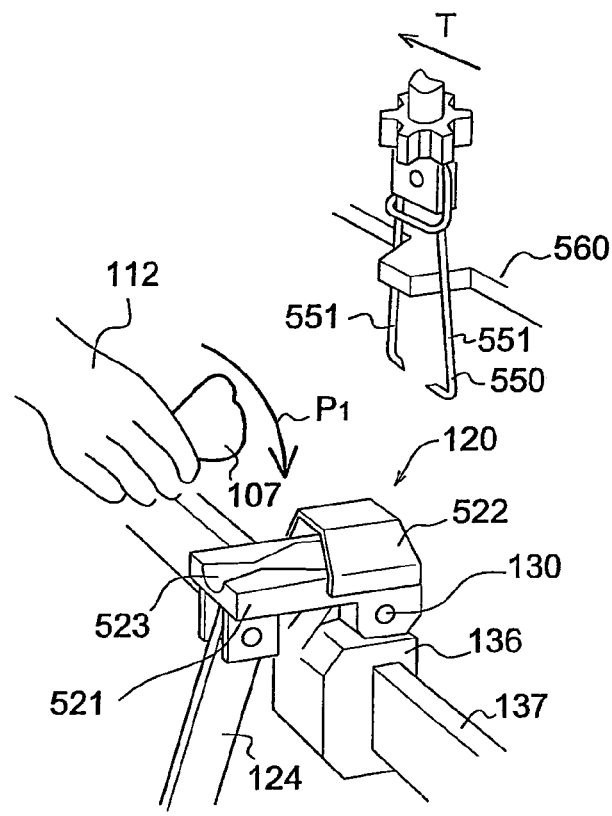
FIG. 19 shows a sixth embodiment of the device and method according to the invention.

FIG. 19A shows how a leg 107 is arranged in the holder 521 by an operator 112. Just as in all other embodiments shown, this could also be done by, for example, a robot or another mechanical supply system rather than by a human operator.

In the example of FIG. 19, the holder 521 is designed for receiving one leg 107. Variants wherein a plurality of legs, leg parts, wings, wing parts or other carcass parts can be placed and/or positioned in the holder are conceivable.

The holder 521 is provided with a curved plate 522 for securing the leg 107 in the holder 521. Also formed in the holder 521 is a recess, the shape of which corresponds substantially to the shape of a leg 107. This recess 523 helps to position the leg 107 in the holder 521.

The curved plate 522 can be configured as one component, although it is possible for there to be two side plates as shown in FIG. 18. It is in this case possible, just as in the variant of FIG. 18, for these side plates to be fixedly connected to the remainder of the holder or for them to be pivotable as described in the discussion of FIG. 18.

FIG. 19A shows that the marinating hook has two legs 551. These legs are moveable, usually pivotable, relative to each other. FIG. 19A shows the marinating hook 550 in the open position, the legs 551 being at a distance from each other such that a carcass part to be carried, in this example a poultry leg 107, can be arranged between the legs 551. In order to hold the legs 551 at a sufficient distance from each other, a spreader 560 is arranged between the legs 551 which spreads legs of the marinating hook 550 preferably counter to a spring force or other restoring force.

Figure 19B:
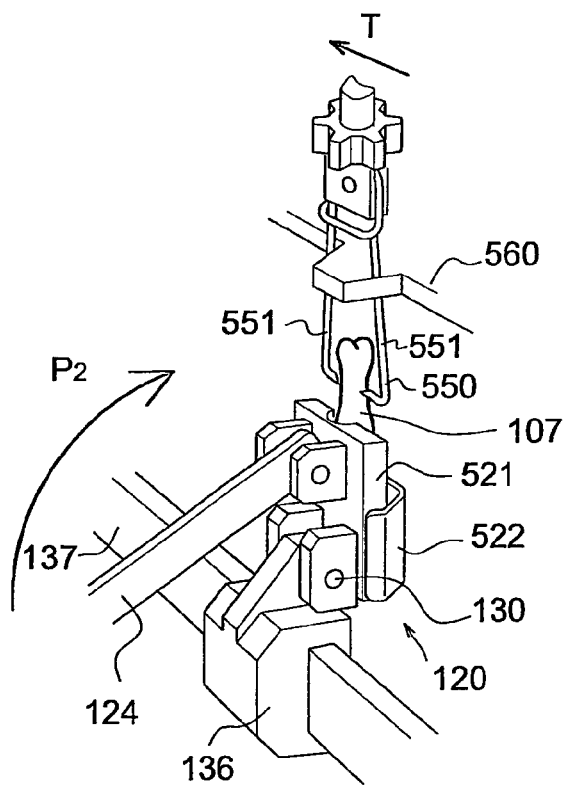

FIG. 19B shows that the holder 521 is transferred from the receiving position (FIG. 19A) to the transfer position. In this embodiment too, this results from the tilting of the holder 521 about the pivot shaft 130 in the direction indicated by arrow P2.

In the transfer position, the free tip of the poultry leg 107 comes to lie between the legs 551 of the marinating hook 550.

Figure 19C:
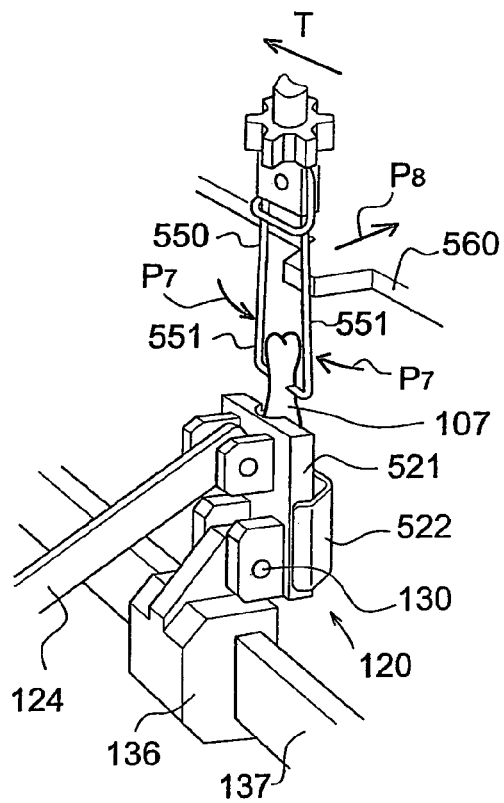
Figure 19D:
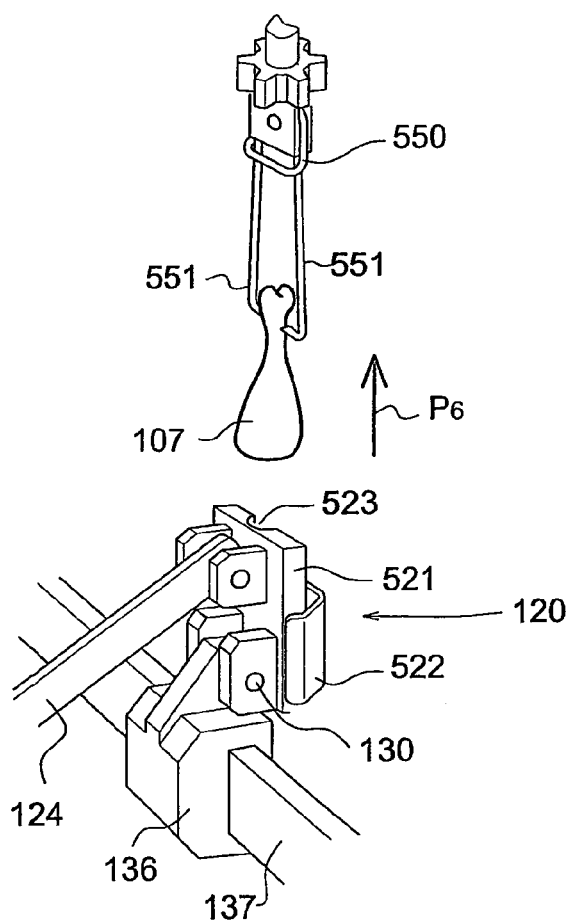

FIG. 19C shows that the marinating hook is closed. This results from the withdrawing of the spreader 560, for example in the direction indicated by arrow P8. A spring force or other restoring force ensures that the legs 551 move towards each other (arrow P7) and securely clamp the poultry leg 107.

As a result of the upward movement of the marinating hook 550 relative to the application unit 120, the leg 107 is lifted out of the holder 521.

FIG. 20 shows a seventh embodiment of the device and method according to the invention.

The functioning of this embodiment is broadly the same as that of the embodiments described hereinbefore. Corresponding components are denoted by corresponding reference numerals.

In the embodiment of FIG. 20, a carcass part, for example a leg 107 or a part thereof or a wing or a part thereof, is fastened to the product carrier 650. In the example of FIG. 20, the product carrier 650 is provided with a skewer 651 which is designed to pierce at least partly through the carcass part and thus to carry the carcass part. The product carrier 650 is placed on the guide rail 652 and can move relative to this rail in the direction of transportation T. Although just one product carrier 650 is shown on the rail 652, there are preferably a plurality of product carriers 650 which are at a fixed mutual distance. The product carriers 650 are moved by a drive comprising, for example, a chain 653.

Figure 20A:
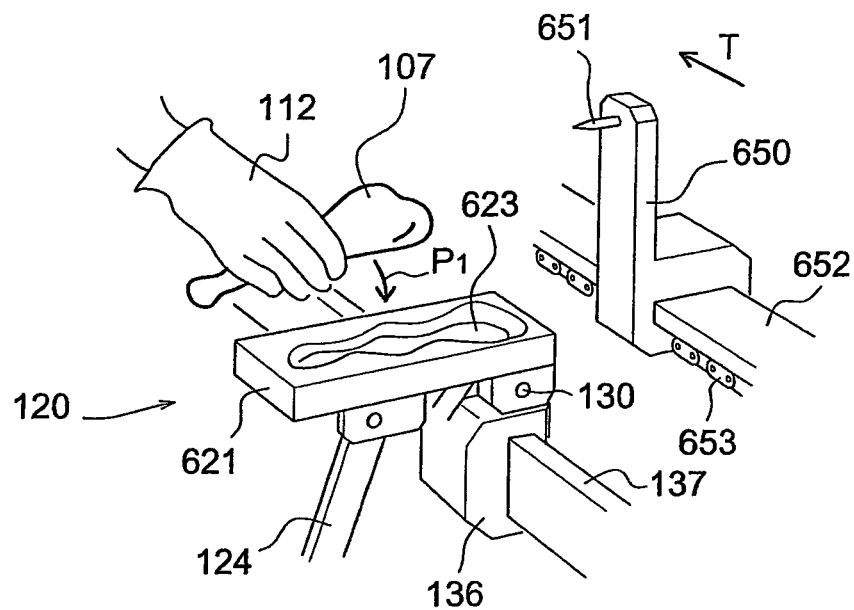
FIG. 20 shows a seventh embodiment of the device and method according to the invention.

FIG. 20A shows the introduction of a carcass part, in this example a leg 107, in the holder 621 of the application unit 120. In this example, a human operator places the leg 107 in the holder, although this could also be carried out by a robot or another mechanical device. In FIG. 20A, the holder 621 is in the receiving position.

The holder 621 is provided with a recess 623, the shape of which corresponds substantially to the shape of the leg 107. This recess helps to position the leg 107 relative to the holder 621.

Figure 20B:
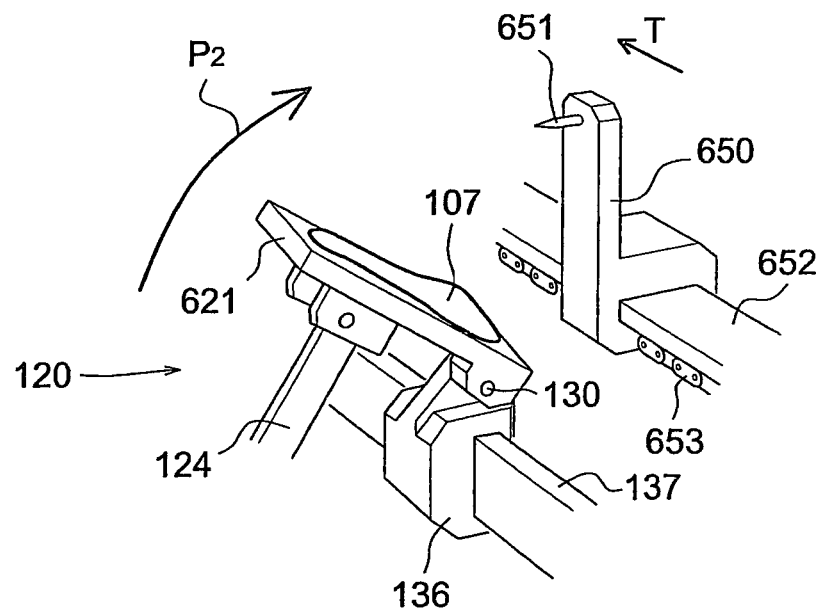

FIG. 20B shows the transfer of the holder with the leg 621 from the receiving position to the transfer position (arrow P2). The holder 621 in this case pivots about the pivot shaft 130. The speed of the movement of the holder 621 from the receiving position to the transfer position is preferably so high that the mass inertia holds the leg 107 in the holder 621. It is also possible to make the recess 623 so deep that the leg 107 remains therein during the pivoting to the transfer position.

In an alternative variant (not shown), the product carrier moves towards the holder, the holder remaining substantially in the receiving position.

Figure 20C:
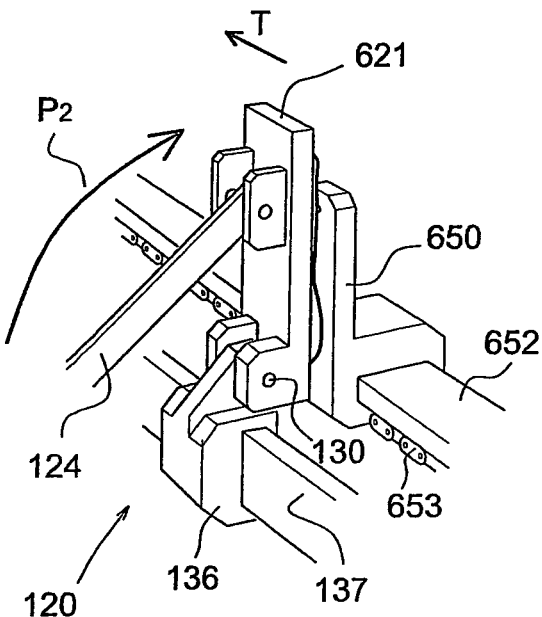

FIG. 20C shows the arrangement of the leg 107 on the product carrier 650. The holder 621 presses the leg 107 onto the skewer 651 of the product carrier 650. Preferably, the leg 107 is positioned in such a way that the skewer 651 passes between the bones of the leg 107, so that no bone splinters are caused in the meat. It is possible for the skewer 651 to have one or more barbs which ensure that the leg 107 remains suspended from the skewer 651 when the holder is tilted back from the transfer position to the receiving position.

Figure 20D:
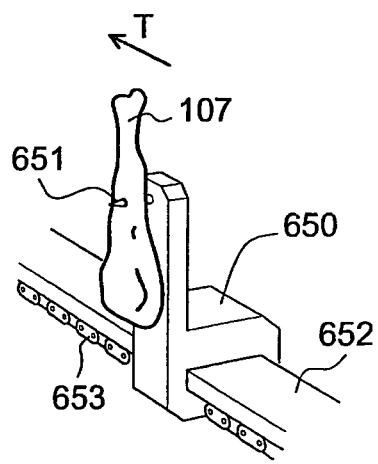

FIG. 20D shows a leg 107 arranged on the product carrier 650.

FIG. 21 shows an eighth embodiment of the device and method according to the invention.

The functioning of this embodiment is broadly the same as that of the embodiments described hereinbefore. Corresponding components are denoted by corresponding reference numerals.

Figure 21A:
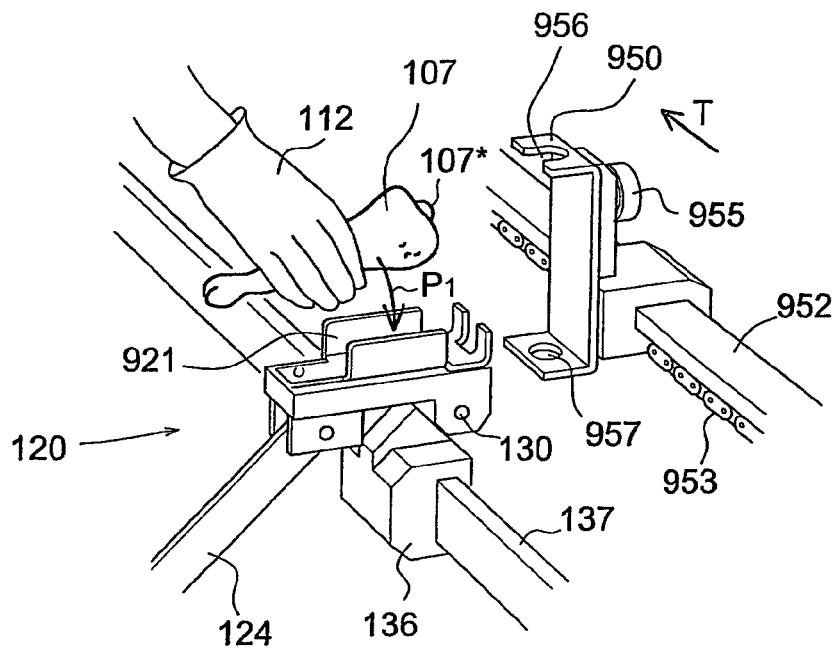
FIG. 21 shows an eighth embodiment of the device and method according to the invention.

FIG. 21A shows the introduction of a carcass part, in this example a leg 107, into the holder 921 of the application unit 120 (arrow P1). In this embodiment, a human operator 112 places the leg 107 in the holder, although this could also be carried out by a robot or another mechanical device. In FIG. 21A, the holder 921 is in the receiving position.

Figure 21B:
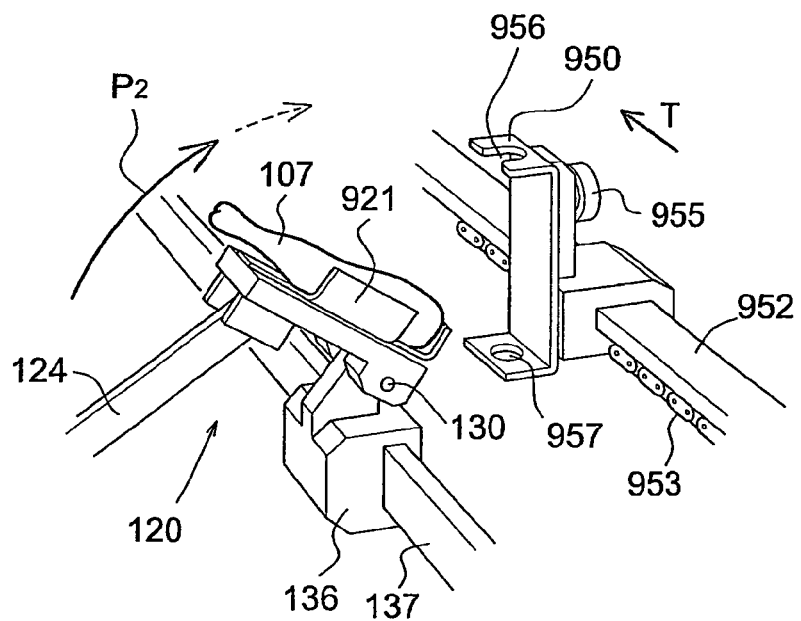

FIG. 21B shows the transfer of the holder 921 with the leg 107 from the receiving position to the transfer position (arrow P2). The holder 921 in this case pivots about the pivot shaft 130.

In the embodiment of FIG. 21, the product carrier 950 is provided with a receiving slot 956 and with a recess 957. The recess 957 is intended to receive a bone part 107* projecting from the wide side of the leg 107. The recess 957 can, if desired, also receive a different projecting part of a carcass part.

Figure 21C:
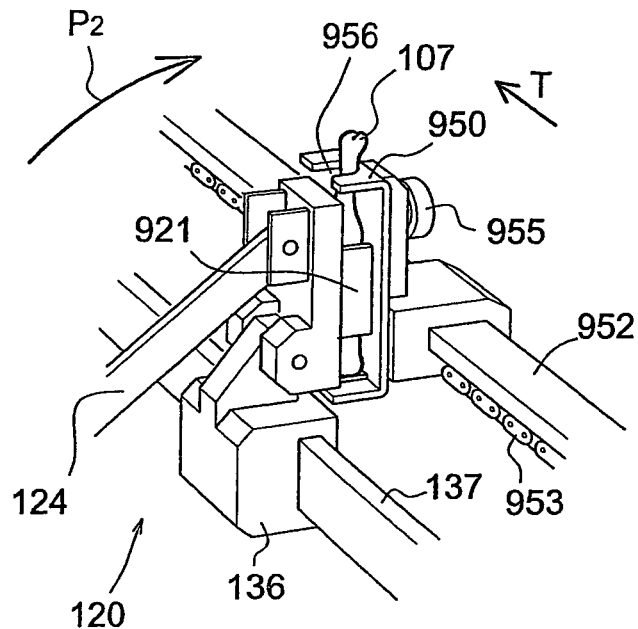

FIG. 21C shows the holder 921 in the transfer position. The narrow part of the leg 107 is arranged in the receiving slot 956, whereas the projecting bone part 107* lies in the recess 957.

Figure 21D:
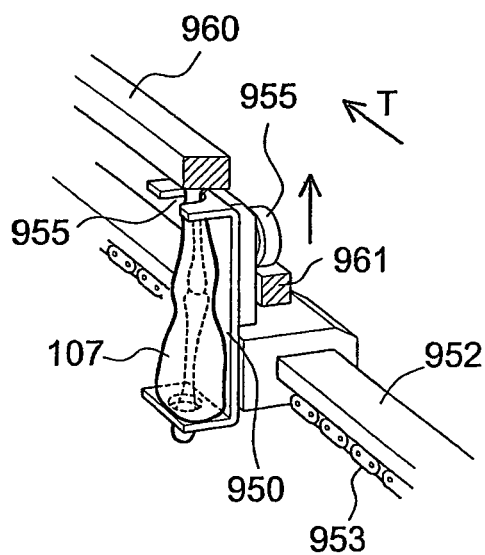

In the situation of FIG. 21D, the holder 921 has returned to the receiving position. The leg 107 is arranged in the product carrier 950, but is still slightly loose. In order to cause the product carrier 950 to fix the leg 107 more securely, guides 960 and 961 and the product carrier are provided with a cam roller 955. The leg guide 960 is located above the leg. The roller guide 961 is located below the roller 955.

Figure 21E:
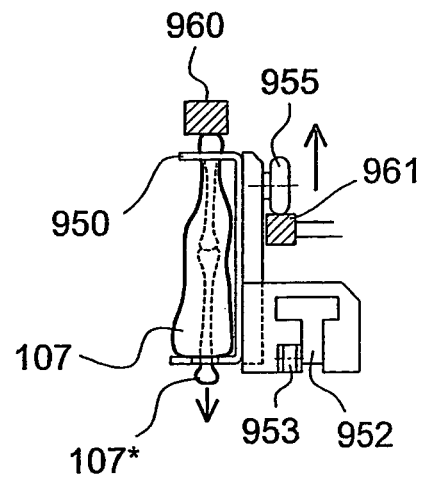

During the movement of the product carrier 950 in the direction of transportation T, the roller guide 961 presses the roller 955, and thus the product carrier 950, upward. The leg guide 960 prevents the leg 107 arranged in the product carrier 950 from moving upwards too far with the product carrier. As a result of this combined action of the guides 960, 961, the projecting bone part 107* is pressed deeper into or even through the recess 957. This is shown in FIG. 21E.

Figure 22:
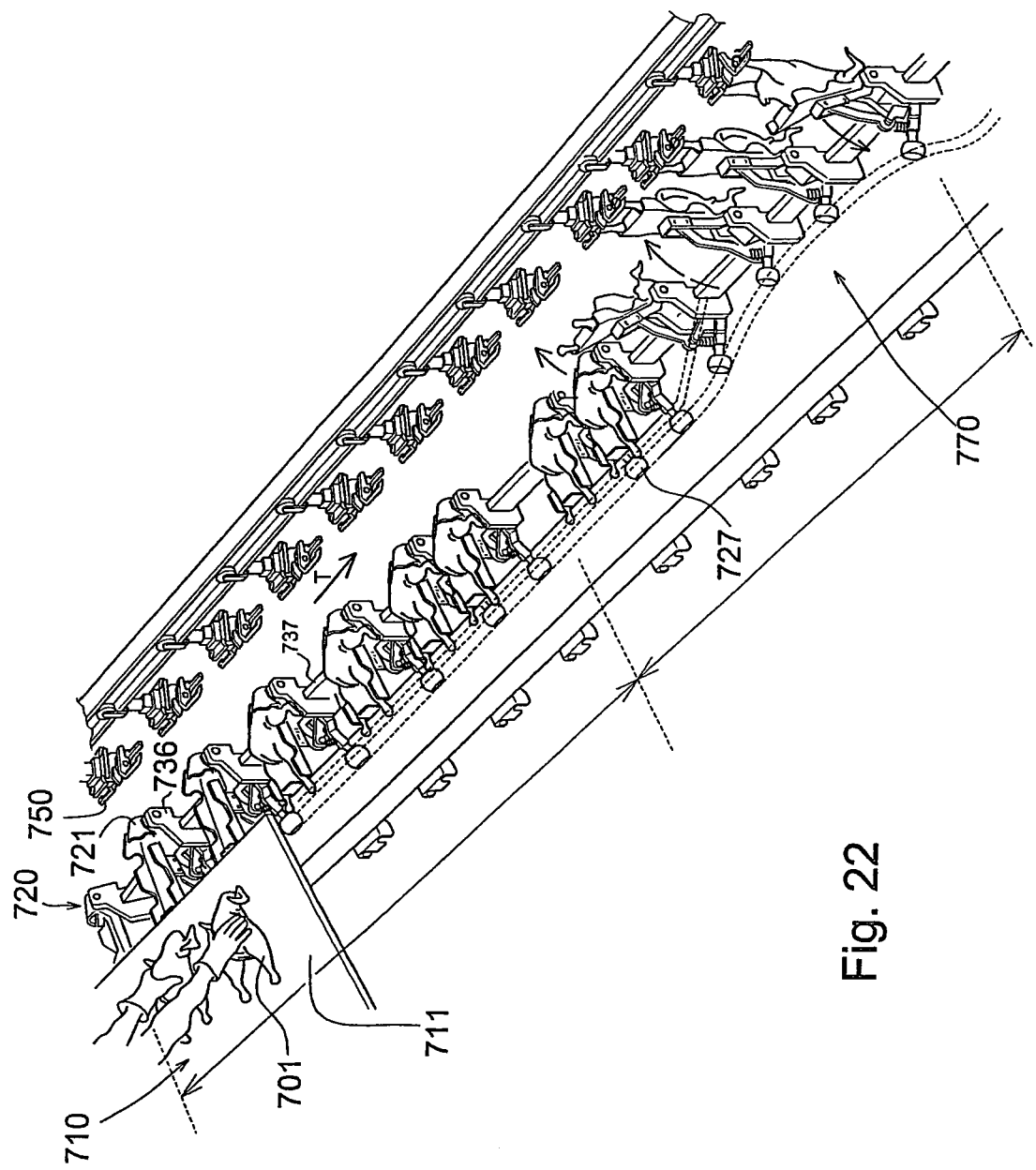
FIG. 22 shows a second example of an embodiment of a system comprising a device according to the invention.

FIG. 22 shows a second example of an embodiment of a system comprising devices according to the invention.

The system of FIG. 22 comprises a number of set-up units 720 according to the invention. Each of the set-up units 720 comprises a holder 721 and a base part 736. The holder 721 is pivotable relative to the base part 736. The set-up units are moved by means of a drive (not shown) along a base part guide 737 in the direction of arrow T.

The system of FIG. 22 comprises a supply station 710 with a feed plate 711. An operator places a carcass 701 on the feed plate 711 and slides the carcass over the feed plate 711 into the holder of a passing set-up unit 720. As it passes the supply station 710, the holder 721 is in the receiving position.

Because arranging the carcass 701 in the holder 721 requires no or almost no force, a single operator can easily take a carcass in each hand and arrange two carcasses simultaneously. In the case of the known systems, the operator must always use both his hands to arrange a single carcass in or on a product carrier. As a result of the fact that the operator can arrange two carcasses simultaneously in this system, a single operator can arrange more carcasses per unit of time than with known systems.

In the example of FIG. 22, the set-up units 720 are not directly coupled to one another. As a result, there does not have to be a fixed distance between successive set-up units. The distance between successive set-up units can also vary in accordance with the position of the set-up units in the system. Thus, it is for example possible to provide the set-up units at the location of the supply station with a mutual distance such that the operator can easily arrange the carcasses in the holders, preferably in an ergonomically expedient manner in which body parts are not overly loaded.

Once they have passed the supply station, the set-up units are brought to the application location 770 by their drive. At the application location 770 of the system, the carcasses are arranged on the product carriers 750. For this purpose, the holders 721 of the set-up units are tilted to the transfer position in the supply station. Preferably, the speed of the set-up units and the mutual distances thereof in the application location are adapted to the speed of the product carriers 750 and the mutual distances thereof. Generally, the speed of the set-up units at the application location will be higher than in the supply station. The mutual distance between successive set-up units will usually be greater in the application location than in the supply station.

The variation in speed and mutual distances is for example achieved by a drive having one or more servomotors or having a mechanism comprising eccentric gear-wheels.

Once they have passed the application location, the set-up units are returned to the supply station. The holders 721 are in this case tilted back to the receiving position so that when they arrive at the supply station, they can again receive a following carcass.

Figure 23:
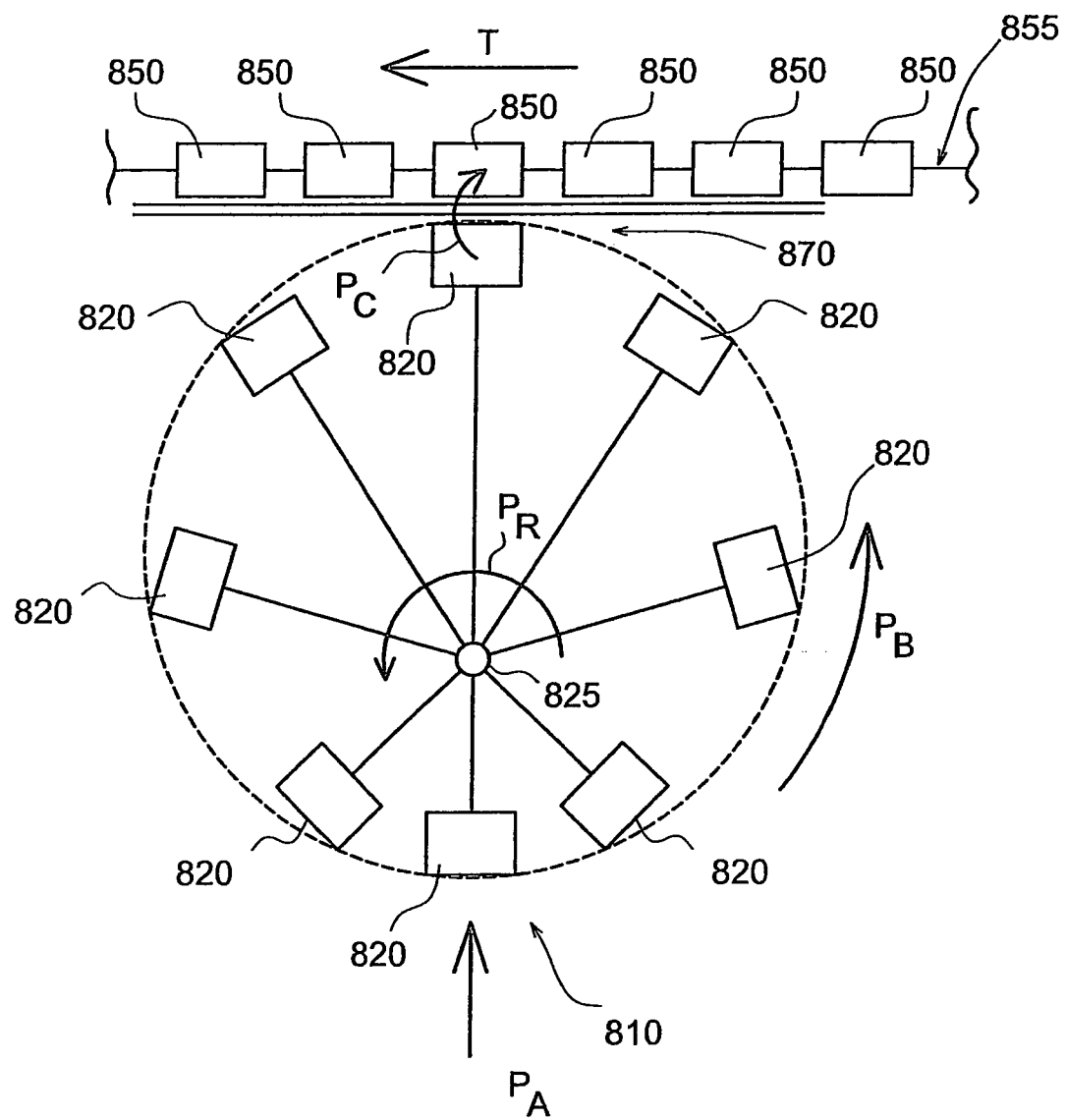
FIG. 23 is a schematic view of an alternative embodiment of the system according to the invention.

FIG. 23 is a schematic view of an alternative embodiment of the system according to the invention.

In the system of FIG. 23, the system comprises a plurality of set-up units 820 which are connected to a central shaft 825. As an alternative, the set-up units can be connected to a disc which rotates about the central shaft 825 in the direction indicated by arrow $P_R$. The distance between an individual set-up unit and the central shaft 825 varies during a revolution about the central shaft 825.

In the supply station 810, carcasses or carcass parts which are supplied in the direction indicated by arrow PA are arranged on or in passing set-up units 820.

After the arrangement of a carcass or carcass part, the set-up units continue to rotate in the direction indicated by arrow PB. The distance from the set-up unit 820 to the central shaft 825 becomes greater and greater, as a result of which the mutual distance between successive set-up units 820 and the speed of the set-up units 820 increases. The increase in distance and speed is such that when a set-up unit arrives at the application location 870, the speed and the distance are adapted to the product carriers of the product line 855 which move in the direction of arrow T.

At the application location 870, the carcasses or carcass parts are arranged in or on the product carriers 850 in the direction indicated by arrow $P_C$. The empty set-up units afterwards return to the supply station 810 where they are again provided with a carcass or carcass part. Between the application location 870 and the supply station 810, the distance between the set-up unit and the central shaft is again reduced, so that the speed and the mutual distance between successive product carriers is again suitable for placing carcasses or carcass parts in the set-up units.

FIG. 23 shows a constructionally simple manner to create a variation in distance and speed of the product carriers. In this way, the carcass or carcass part can be placed in a holder of a set-up unit at a relatively low speed; this is desirable from the point of view of ergonomics. This system ensures that after the operator has arranged the carcass or carcass part, the carcasses or carcass parts are accelerated so that they can be arranged in a high-speed production line. In this way, it is possible to arrange products in a high-speed production line in an ergonomically expedient manner.

Various embodiments of the invention have been described hereinbefore. It will be clear to a person skilled in the art that the various embodiments and individual aspects thereof may also be combined with one another.

CLAUSES

1. Device for bringing into position and arranging a breast cap of slaughtered poultry on a product carrier, which device comprises:
   a movable holder for the breast cap with associated positioning means for the breast cap, which holder is designed for receiving a breast cap to be arranged on a product carrier,
   drive means for the movable holder, in such a way that the holder is movable between a receiving position in which the breast cap can be received and a transfer position in which the breast cap is brought into a position relative to the product carrier that is suitable for transfer to the product carrier,
   an application mechanism which is designed—in the transfer position of the product holder with the breast cap—to arrange the breast cap on the product carrier.
2. Device according to clause 1, wherein the product carrier is designed to arrange the breast cap thereon by pressing the breast cap onto the product carrier, the application mechanism being configured as a pressing mechanism which is designed to press—in the transfer position of the product holder with the breast cap—the breast cap onto the product carrier, so that the breast cap is arranged on the product carrier.
3. Device according to clause 1 or 2, wherein the holder is designed to place the breast cap in the holder without exerting any significant force.
4. Device according to one or more of the preceding clauses, wherein the holder, in the receiving position, is an open holder into which the breast cap can be inserted.
5. Device according to one or more of the preceding clauses, wherein the holder, in the receiving position, is a holder which is open at the top and into which the breast cap is inserted with the back of the breast cap facing upward.
6. Device according to clause 4 or 5, wherein the holder—viewed in the receiving position—is substantially V-shaped, for example with two opposing oblique side walls between which the breast cap can be placed, optionally with a base between the side walls, which obliquely arranged side walls centre the breast cap relative to the holder.
7. Device according to one or more of the preceding clauses, wherein the holder is movable between a substantially horizontal receiving position and a substantially vertical transfer position.
8. Device according to one or more of the preceding clauses, wherein a neck support is provided with each holder, which neck support is designed to interact with the neck side of the breast cap, designed and arranged in such a way that the neck support positions the neck side of the breast cap, the neck support having for example a centring means such as a centring surface which is designed to search near the centre of the neck surface of the breast cap.

9. Device according to clause 8, wherein the neck support is separate from the movable holder, in such a way that the holder is movable relative to the neck support on movement of the holder from the receiving position to the transfer position and/or from the transfer position to the receiving position.

10. Device according to clauses 7 and 9, wherein the holder and the neck support are designed and arranged in such a way that—when the breast cap is placed in the holder in such a way that the breast cap is directed with its neck side towards the neck support—during the upward movement of the holder from the receiving position to the transfer position the breast cap lies with its neck side against the neck support and slides along the latter, so that the breast cap rests on the neck support with its neck side at the bottom in the transfer position.

11. Device according to clause 2, wherein the pressing mechanism comprises a pressing member which is arranged on the movable holder, is movable relative thereto and is adapted, during operation thereof, to press—with the holder in the transfer position—the breast cap onto the product carrier.

12. Device according to clauses 7 and 11, wherein the transfer position is substantially vertical and wherein the pressing member is adapted to press the breast cap downward in order to arrange the breast cap on the product carrier.

13. Device according to clause 11 or 12, wherein the pressing member is adapted to engage the breast cap at the breast point.

14. Device according to clause 13, wherein the pressing member has spaced-apart pressing surfaces which are arranged to engage on either side of the breast cap, preferably in proximity to the breast point, preferably two pressing surfaces arranged substantially in an inverted V shape.

15. Device according to clause 11, wherein the pressing member has a guide for guiding the pressing member relative to the holder.

16. Device according to clauses 9 and 11, wherein the neck support is arranged at one end of the holder and the holder is provided at its other end with the pressing member which is movable in the direction towards and away from the neck support, in such a way that the breast cap should be placed in the holder with its neck side directed towards the neck support and with its breast point directed towards the pressing member.

17. Device according to one or more of the preceding clauses, wherein the device has a plurality of movable holders which are each adapted for receiving a breast cap to be arranged on a product carrier, which holders are spaced apart and can be moved along an associated path of the device by associated drive means, in such a way that, in a supply position along the path, a breast cap can be received in a holder and, in a downstream application location, the holder is in the transfer position, the application mechanism being designed to arrange, at the application location—in the transfer position of the product holder with the breast cap—the breast cap to the product carrier.

18. Device according to clause 17, adapted to be combined with a transportation device provided with a plurality of product holders which are spaced apart and can be moved along an associated transportation path, the mutual distance between the holders and the speed of the holders of the device being adapted to the distance between the product carriers and the speed of the product carriers.

19. Device according to clauses 11 and 17, wherein the pressing mechanism comprises a pressing member movement mechanism which is arranged at the application location and is adapted to enter into engagement with the pressing member and thus to press the breast cap onto the product carrier.

20. Device according to clause 17, wherein the device, at the feed location, has a feed plate on which a breast cap can be placed and can then be slid from the feed plate so that said breast cap enters a passing holder, for example wherein the holders pass at a lower level than the feed plate, for example in such a way that any pressing member present on the holder passes along the bottom of the feed plate.

21. Device according to one or more of clauses 8-10, wherein the device is adapted to be combined with a product holder adapted for pressing the breast cap thereon with the breast point at the top and with the neck side at the bottom: the product carrier having an upwardly directed hook which can grip the breast cap at the neck side, the top of the neck support being at the level of the upper side of the hook.

22. Device according to clause 17, wherein each holder includes a base part on which the holder is movably mounted, the device having a base part guide along which the base parts are moveable, for example a looped rail, for example in the vertical plane.

23. Device according to clause 22, wherein a cam track following mechanism is provided with each holder and the device is provided with a suitable cam track for producing the movement of the holder.

24. Device according to clause 22, wherein the neck support is mounted on the base part separately from the holder, and wherein the neck support is optionally movably mounted, a cam track following mechanism optionally being provided with the movable neck support and the device being provided with a suitable cam track for producing the movement of the neck support.

25. System comprising a device according to one or more of the preceding clauses and also a transportation device provided with one or more product carriers on which a breast cap can be arranged by means of the device.

26. System according to clause 25, wherein the system further comprises a mechanical supply device for supplying breast caps to the device according to one or more of the preceding clauses 1-24.

27. Method for arranging a breast cap of slaughtered poultry on a product carrier, wherein use is made of a device or system according to one or more of the preceding clauses.

28. Method for arranging a breast cap of slaughtered poultry on a product carrier, which method includes:
   arranging a breast cap of slaughtered poultry in a holder of a device according to clause 1, the holder being in the receiving position,
   positioning the breast cap in the holder by means of positioning means pertaining to the holder,
   moving the holder from the receiving position to the transfer position, and
   transferring the breast cap from the holder to the product carrier, in such a way that the breast cap is arranged on the product carrier.

29. Method according to clause 28, wherein at least some of the positioning means engage the neck side of the breast cap for positioning the breast cap in the holder.

30. Method for arranging a breast cap of slaughtered poultry on a product carrier, which method includes:
   positioning the breast cap relative to the product carrier with the aid of positioning means which act on the neck side of the breast cap, and
   arranging the breast cap on the product carrier.

31. Set-up unit for use in a device according to clause 1, which set-up unit comprises:
- a movable holder for the breast cap with associated positioning means for the breast cap, which holder is designed for receiving a breast cap to be arranged on a product carrier,
- at least a part of a drive for the movable holder, in such a way that the holder is movable between a receiving position in which the breast cap can be received and a transfer position in which the breast cap is brought into a position relative to the product carrier that is suitable for transfer to the product carrier,
- an application mechanism which is designed to arrange—in the transfer position of the product holder with the breast cap—the breast cap on the product carrier, and
- a base part to which the movable holder, that part of the drive which is present and the application mechanism are fastened.

The invention claimed is:

1. A device for bringing into position and arranging a carcass or carcass part of slaughtered poultry on or in a product carrier, which device comprises:
- at least one assembly of a base part and an associated movable holder for the carcass or carcass part of slaughtered poultry with a positioning device associated with the holder for the carcass or carcass part, which holder is adapted for receiving a carcass or carcass part to be arranged on or in a product carrier,
- a drive device that moves the holder relative to the base part associated with the respective holder between a receiving position in which the carcass or carcass part can be received and a transfer position in which the carcass or carcass part is brought into a position relative to the product carrier that is suitable for transfer to the product carrier.

2. The device according to claim 1, wherein the device further comprises an application mechanism which is adapted—in the transfer position of the holder with the carcass or carcass part—to arrange the carcass or carcass part on or in the product carrier.

3. The device according to claim 2, wherein the holder is adapted for receiving a breast cap of slaughtered poultry to be arranged on or in a product carrier, and wherein the device is adapted to interact with a product carrier which is adapted to arrange the breast cap thereon by pressing the breast cap onto the product carrier, the application mechanism being configured as a pressing mechanism which is adapted—in the transfer position of the holder with the breast cap—to press the breast cap onto the product carrier, so that the breast cap is arranged on the product carrier.

4. The device according to claim 3, wherein the pressing mechanism comprises a pressing member which is arranged on the holder, is movable relative thereto and is adapted, during operation thereof, to press—with the holder in the transfer position—the breast cap onto the product carrier.

5. The device according to claim 4, wherein the holder is movable between a substantially horizontal receiving position and a substantially vertical transfer position, and wherein the transfer position is substantially vertical and wherein the pressing member is adapted to press the breast cap downwards in order to arrange the breast cap on the product carrier.

6. The device according to claim 4, wherein the pressing member is adapted to act on the breast cap at the breast point.

7. The device according to claim 6, wherein the pressing member has two spaced-apart pressing surfaces which are arranged in an inverted V shape to engage on either side of the breast cap.

8. The device according to claim 7, wherein the two spaced-apart pressing surfaces engage in proximity to the breast point.

9. The device according to claim 4, wherein the pressing member has a guide for guiding the pressing member relative to the holder.

10. The device according to claim 4, wherein a neck support is provided with each holder, which neck support is designed to interact with the neck side of the breast cap, designed and arranged in such a way that the neck support positions the neck side of the breast cap, the neck support having centering surface which is designed to search near the center of the neck surface of the breast cap, and wherein the neck support is arranged at one end of the holder and the holder is provided at its other end with the pressing member which is movable in the direction towards and away from the neck support, in such a way that the breast cap should be placed in the holder with its neck side directed towards the neck support and with its breast point directed towards the pressing member.

11. The device according to claim 1, wherein the holder is adapted to place the carcass or carcass part in the holder without exerting any significant force.

12. The device according to claim 1, wherein the holder, in the receiving position, is an open holder into which the carcass or carcass part can be inserted.

13. The device according to claim 1, wherein the holder is movable between a substantially horizontal receiving position and a substantially vertical transfer position.

14. The device according to claim 13, wherein the holder is pivotable-between the substantially horizontal receiving position and the substantially vertical transfer position.

15. The device according to claim 1, wherein the device further has a feed plate on which a carcass or carcass part can be placed and then can be slid from the feed plate so that said carcass or carcass part enters the movable holder—which is in the receiving position.

16. The device according to claim 1, wherein the holder is adapted for receiving a breast cap of slaughtered poultry to be arranged on or in a product carrier.

17. The device according to claim 16, wherein the holder, in the receiving position, is an upwardly open holder into which the breast cap is inserted with the back of the breast cap facing upward.

18. The device according to claim 16, wherein the holder—viewed in the receiving position—is substantially V-shaped.

19. The device according to claim 18, wherein the holder has two opposing oblique side walls between which the breast cap can be laid, with a base between the side walls, and the oblique side walls center the breast cap relative to the holder.

20. The device according to claim 16, wherein a neck support is provided with each holder, which neck support is designed to interact with the neck side of the breast cap, designed and arranged in such a way that the neck support positions the neck side of the breast cap, the neck support having a centering surface which is designed to search near the center of the neck surface of the breast cap.

21. The device according to claim 20, wherein the neck support is separate from the movable holder, in such a way that the holder is movable relative to the neck support on movement of the holder from the receiving position to the transfer position and/or from the transfer position to the receiving position.

22. The device according to claim 21, wherein the holder and the neck support are designed and arranged in such a way that—when the breast cap is placed in the holder in such a way that the breast cap is directed with its neck side towards the neck support—during the upward movement of the holder from the receiving position to the transfer position the breast cap lies with its neck side against the neck support and slides along the latter, so that the breast cap rests on the neck support with its neck side at the bottom in the transfer position.

23. The device according to claim 1, wherein the holder is adapted to receive a carcass or carcass part of slaughtered poultry to-be arranged on or in a product carrier, which carcass comprises at least one leg part, which device is adapted to interact with a product carrier engaging a leg part of the carcass or carcass part.

24. The device according to claim 23, wherein the holder comprises a recess for receiving a wing part which is present on the carcass or carcass part.

25. The device according to claim 24, wherein the recess helps to position the carcass or carcass part relative to the holder.

26. The device according to claim 23, wherein the holder comprises a sleeve-like part for receiving a part of the carcass or carcass part, which sleeve-like part helps to position the carcass or carcass part relative to the holder.

27. The device according to claim 1, wherein the holder is adapted for receiving a front half, the device being adapted to interact with a product carrier engaging the inside of the front half.

28. The device according to claim 27, wherein the device comprises an application mechanism which is adapted—in the transfer position of the holder with the carcass or carcass part—to arrange the carcass or carcass part on or in the product carrier.

29. The device according to claim 28, wherein the application mechanism comprises a pressing member for pressing the front half onto the product carrier.

30. The device according to claim 29, wherein the pressing member is adapted to also move the holder towards the product carrier when pressing the front half onto the product carrier.

31. The device according to claim 29, wherein the pressing member is adapted to move the front half relative to the holder when pressing the front half onto the product carrier.

32. The device according to claim 1, wherein the holder is adapted to receive at least one of the following: a whole carcass, a front half, a back half, a breast cap, a leg, a leg part, a wing, a wing part, a back piece.

33. The device according to claim 1, wherein the holder is adapted to receive a carcass or carcass part which is provided with a marinade and/or coating.

34. A method for arranging a carcass or carcass part of slaughtered poultry on a product carrier, comprising the step of using the device according to claim 1.

35. An application unit for use in a device according to claim 1, which application unit comprises:
- a movable holder for the carcass or carcass part with an associated positioning device for the carcass or carcass part, which holder is adapted for receiving a carcass or carcass part to be arranged on a product holder,
- at least a part of a drive for the movable holder, in such a way that the holder is movable between a receiving position in which the carcass or carcass part can be received and a transfer position in which the carcass or carcass part is brought into a position relative to the product carrier that is suitable for transfer to the product carrier, and
- a base part on which the movable holder and the present part of the drive are mounted.

36. The application unit according to claim 35, which application unit further comprises an application mechanism which is adapted—in the transfer position of the holder with the carcass or carcass part—to arrange the carcass or carcass part on the product carrier.

37. The application unit according to claim 36, wherein the application mechanism is mounted on the base part.

38. A system for bringing into position and arranging a carcass or carcass part of slaughtered poultry on or in a product carrier, wherein the system comprises at least one device according to claim 1, at least the assembly of the base part and holder of the device being moveable along a track by an associated drive device, in such a way that, in a supply station along the track, a carcass or carcass part can be received in the holder and, at an application location downstream of the supply station, the holder is in the transfer position, wherein at the application location—with the holder having the carcass or carcass part in the transfer position—the carcass or carcass part can be arranged on the product carrier.

39. The system according to claim 38, wherein the system comprises a plurality of devices, each device for bringing into position and arranging a carcass or carcass part of slaughtered poultry on or in a product carrier, which device comprises:
- at least one assembly of a base part and an associated movable holder for the carcass or carcass part of slaughtered poultry with a positioning device associated with the holder for the carcass or carcass part, which holder is adapted for receiving a carcass or carcass part to be arranged on or in a product carrier,
- a drive device that moves the holder relative to the base part associated with the respective holder between a receiving position in which the carcass or carcass part can be received and a transfer position in which the carcass or carcass part is brought into a position relative to the product carrier that is suitable for transfer to the product carrier,
- wherein at least the holders of the devices is spaced apart.

40. The system according to claim 39, adapted to be combined with a transportation device provided with a plurality of product carriers which are spaced apart and are moveable along an associated transportation path, the mutual distance between the holders and the speed of the holders of the device being adapted to the distance between the product carriers and the speed of the product carriers.

41. The system according to claim 38, wherein the system has a base part guide along which the base parts of the device are moveable.

42. The system according to claim 41, wherein the base part guide along which the base parts of the device are moveable is a looped rail in the vertical plane.

43. The system according to claim 38, wherein the system, at the feed location, has a feed plate on which a carcass or carcass part can be placed and can then be slid from the feed plate so that said carcass or carcass part enters a passing holder.

44. The system according to claim 43, wherein the holders pass at a lower level than the feed plate in such a way that any pressing member present on the holder passes along the bottom of the feed plate.

45. The system according to claim 38, wherein a cam track following mechanism is provided for each holder and the system is provided with a suitable cam track for producing the movement of the holder.

46. The system according to claim 38, wherein a neck support is provided with each holder, which neck support is designed to interact with the neck side of the breast cap, designed and arranged in such a way that the neck support positions the neck side of the breast cap, the neck support having centering surface which is designed to search near the center of the neck surface of the breast cap, and wherein the neck support is mounted on the base part separately from the holder, and wherein the neck support is optionally movably mounted, a cam track following mechanism optionally being provided for the movable neck support and the device being provided with a suitable cam track for producing the movement of the neck support.

47. The system according to claim 38, wherein the pressing mechanism comprises a pressing member which is arranged on the holder, is movable relative thereto and is adapted, during operation thereof, to press—with the holder in the transfer position—the breast cap onto the product carrier, and wherein the pressing mechanism comprises a pressing member movement mechanism which is arranged at the application location and is adapted to enter into engagement with the pressing member and thus to press the breast cap onto the product carrier.

48. The system according to claim 38, wherein the holder is adapted for receiving a breast cap of slaughtered poultry to be arranged on or in a product carrier, and wherein the system is adapted to be combined with a holder which is adapted for pressing the breast cap thereon with the breast point at the top and with the neck side at the bottom, the product carrier having an upwardly directed hook which can grip the breast cap at the neck side, the top of the neck support being at the level of the upper side of the hook.

49. The system according to claim 38, wherein there are a plurality of the devices that are movable independently of one another along the track.

50. The system according to claim 38, wherein there are a plurality of the devices and the mutual distance between the devices is variable.

51. The system according to claim 38, wherein there are a plurality of the devices and the drive for moving the devices along the track is adapted to allow or to enforce a variation of the speed of the respective devices.

52. An assembly comprising a device according to claim 1 as well as a transportation device provided with one or more product carriers on which a carcass or carcass part can be arranged using the device.

53. The assembly according to claim 52, wherein the assembly further comprises a mechanical supply device for supplying carcasses or carcass parts to the device.

54. The assembly according to claim 52, wherein the product carriers are cooling line carriers or separating line carriers.

55. The assembly according to claim 52, wherein the product carriers are suitable to be used in a system for marinating and/or coating carcasses or carcass parts of slaughtered poultry.

56. The assembly according to claim 52, wherein the product carriers are provided with a skewer for piercing at least partly through the carcass or carcass part to be carried for attaching the respective carcass or carcass part to the product carrier.

57. A method for arranging a carcass or carcass part of slaughtered poultry on a product carrier, which method includes:
  arranging a carcass or carcass part of slaughtered poultry in a holder of a device according to claim 1, the holder being in the receiving position,
  positioning the carcass or the carcass part in the holder by a positioning device associated with the holder,
  moving the holder from the receiving position to the transfer position, and
  transferring the carcass or carcass part from the holder to the product carrier, in such a way that the carcass or the carcass part is arranged on or in the product carrier.

58. The method according to claim 57, wherein the carcass part is a breast cap and wherein at least some of the positioning means engage the neck side of the breast cap for positioning the breast cap in the holder.

\* \* \* \* \*